United States Patent
Delgado

(10) Patent No.: US 6,729,514 B1
(45) Date of Patent: May 4, 2004

(54) WATERTIGHT MULTI-OPENING LAND OR MARINE VEHICLE STORAGE BOX

(76) Inventor: Armando Delgado, P.O. Box 1020, Durango, CO (US) 81302

( * ) Notice: Subject to any disclaimer, the term of this patent is extended or adjusted under 35 U.S.C. 154(b) by 0 days.

(21) Appl. No.: 10/268,593

(22) Filed: Oct. 9, 2002

(51) Int. Cl.$^7$ ................................................. B60R 9/00

(52) U.S. Cl. ....................... 224/404; 224/539; 296/37.6

(58) Field of Search ................................. 224/404, 539; 220/324, 666, 677, 681, 810, 845, 849; 296/37.5, 37.6

(56) References Cited

U.S. PATENT DOCUMENTS

| | | | | |
|---|---|---|---|---|
| 3,885,701 A | * | 5/1975 | Becklin | 220/681 |
| 4,848,626 A | * | 7/1989 | Waters | 224/404 |
| 5,088,636 A | * | 2/1992 | Barajas | 224/404 |
| 5,232,259 A | * | 8/1993 | Booker | 224/539 |
| 5,299,722 A | * | 4/1994 | Cheney | 296/37.6 |
| 5,398,987 A | * | 3/1995 | Sturgis | 296/37.6 |
| 5,685,593 A | * | 11/1997 | O'Connor | 224/404 |
| 6,089,398 A | * | 7/2000 | Weinstein | 220/324 |
| 6,422,629 B2 | * | 7/2002 | Lance et al. | 224/404 |
| 6,471,278 B2 | * | 10/2002 | Leitner et al. | 296/37.6 |

* cited by examiner

*Primary Examiner*—Gary E. Elkins
(74) *Attorney, Agent, or Firm*—Kenton L. Freudenberg; Maxwell C. Freudenberg

(57) ABSTRACT

An elongated lockable rainproof storage container for use transversely at the forward end of a bed of a pickup truck ahead of typical wheel wells to store and protect tools or other valuable personal items. The container has a horizontal bottom to rest on the bed floor, a first vertical rear wall and two vertical end walls fixed relative to the bottom, and a vertically extending fourth wall facing the pickup tailgate. These four walls are of equal height and support in sealed relationship a top rainproof container closure. An elongated rectangular swingable panel forming a large portion of the fourth wall is connected along its lower long edge to the container bottom by an elongated continuous flexible waterproof plastic hinge permitting the panel to swing about ninety degrees inwardly from a vertical wall position to a horizontal floor position lying atop the container bottom where it provides a load supporting upper surface parallel to the bed floor. When the closure is opened or removed and the panel swung down to its horizontal position almost the entire inner area of the container becomes a usable vertically unobstructed storage area supplemental to the area between the container and the tailgate to facilitate hauling large crates, boxes, lumber or sheets of building material. In the vertical position of the swingable panel its opposite ends are held in waterproof sealing engagement with jambs extending inwardly from the container end walls. The container may be of sufficient size to allow the jamb spacing to correspond to wheel well spacing. A sill member extends across the container bottom between the jambs and supports in close relationship, via the elongated hinge, the bottom edge of the swingable panel. The ends of the elongated waterproof hinge and lower ends of seals along the jambs cooperate to assure watertight seals along the bottom and ends of the swingable panel when it is secured in its vertical position. The proximity of the edge of the swingable panel and the sill member substantially conceal the elongated hinge and protect it from damage and wear when the panel is in its horizontal position.

30 Claims, 26 Drawing Sheets

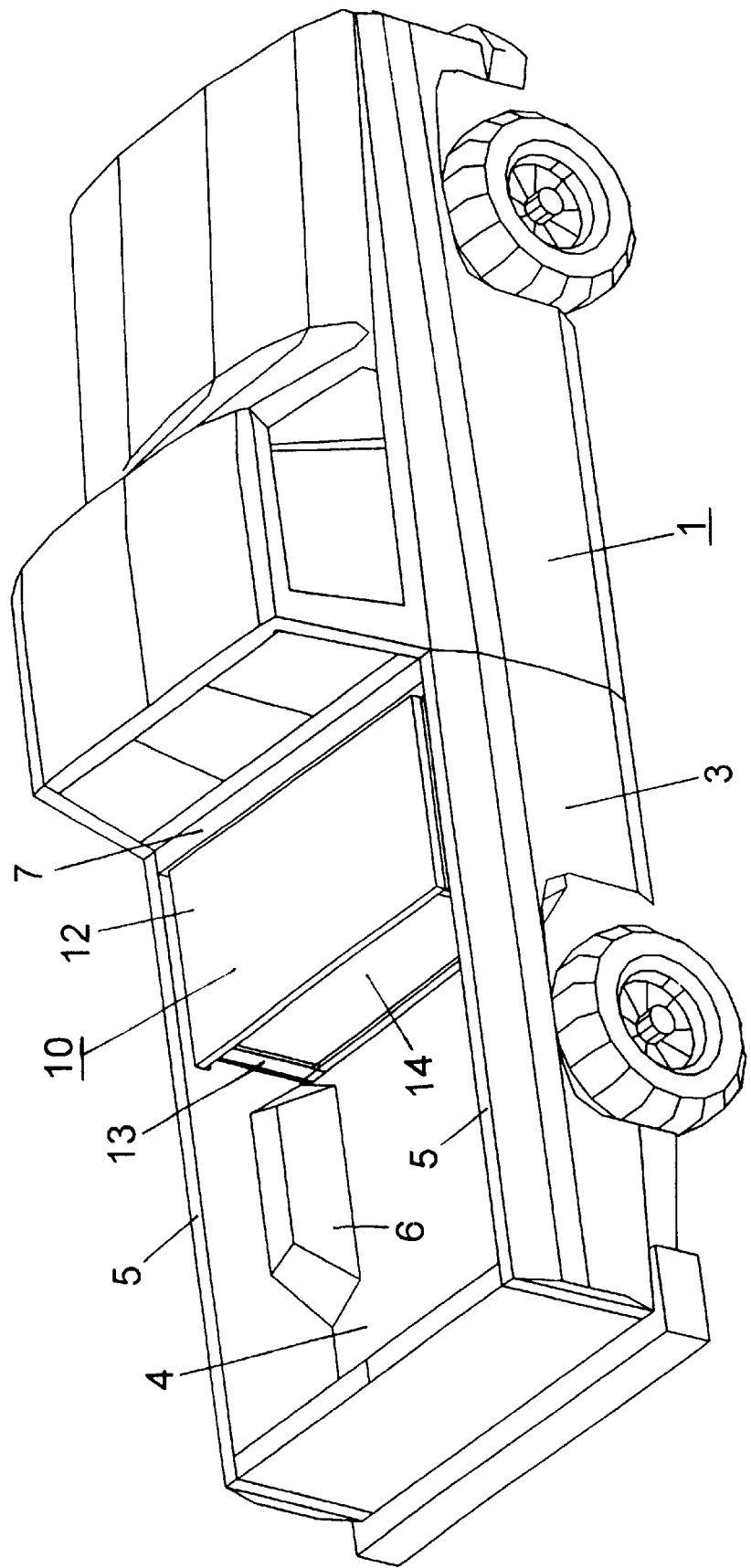

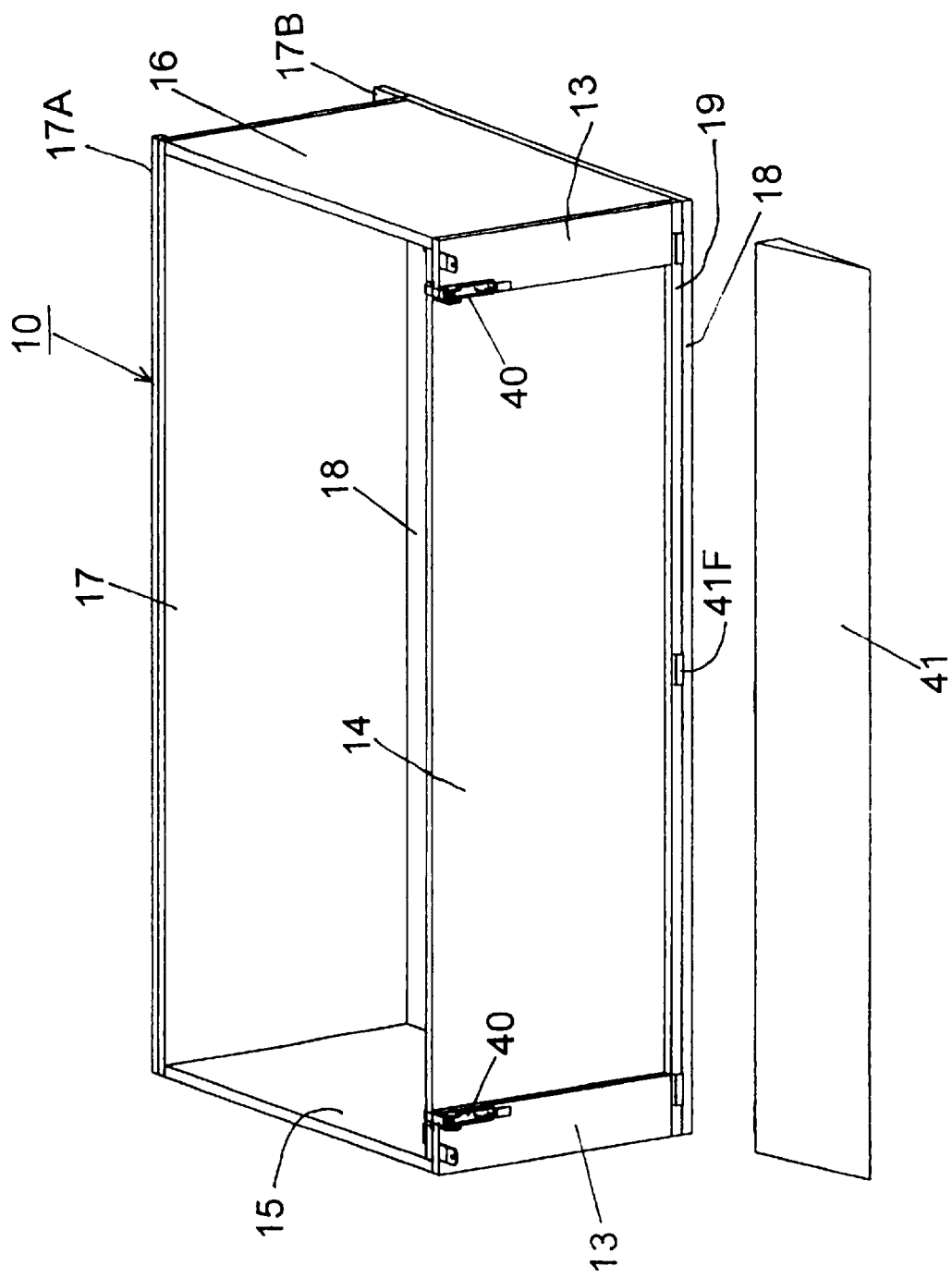

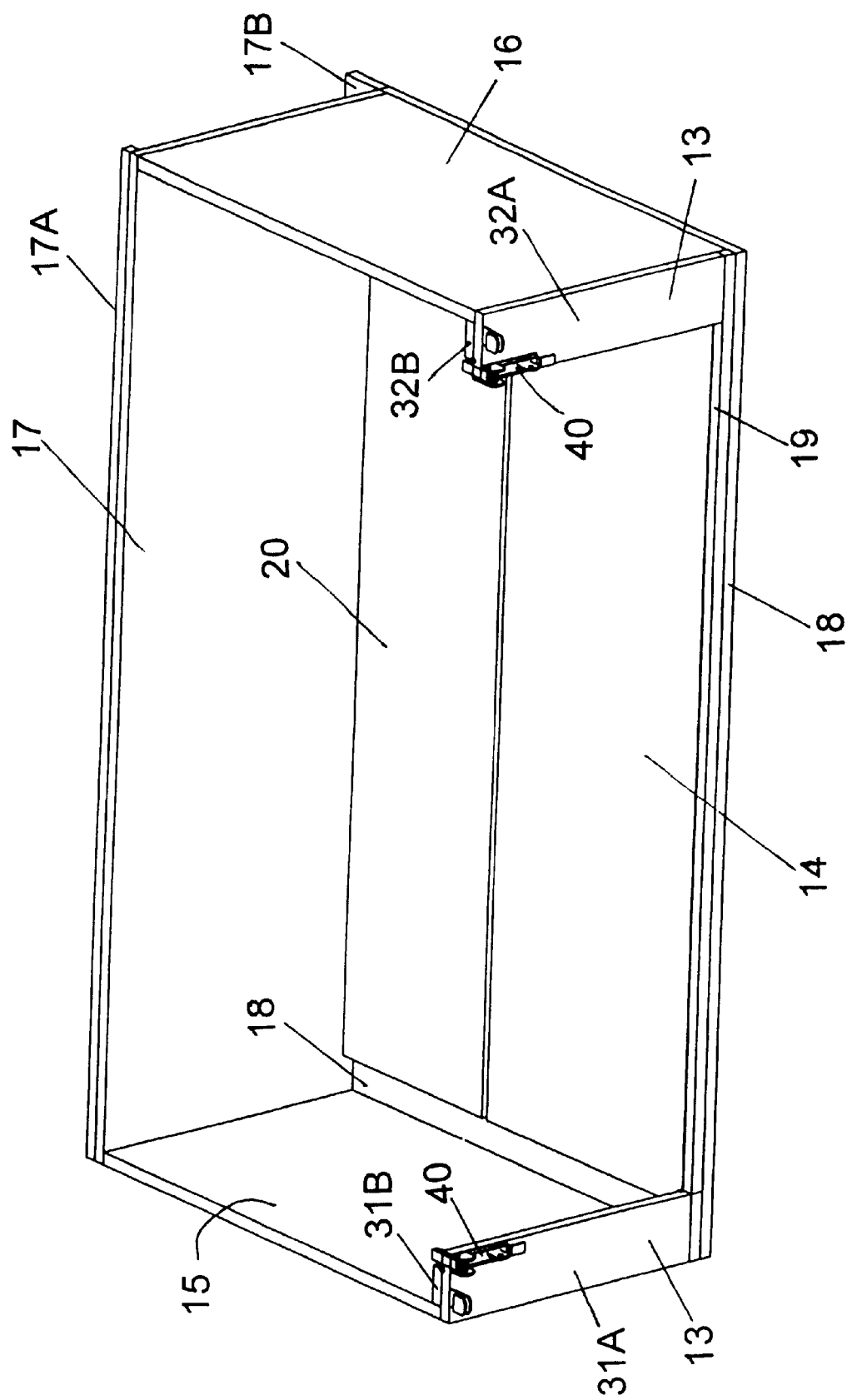

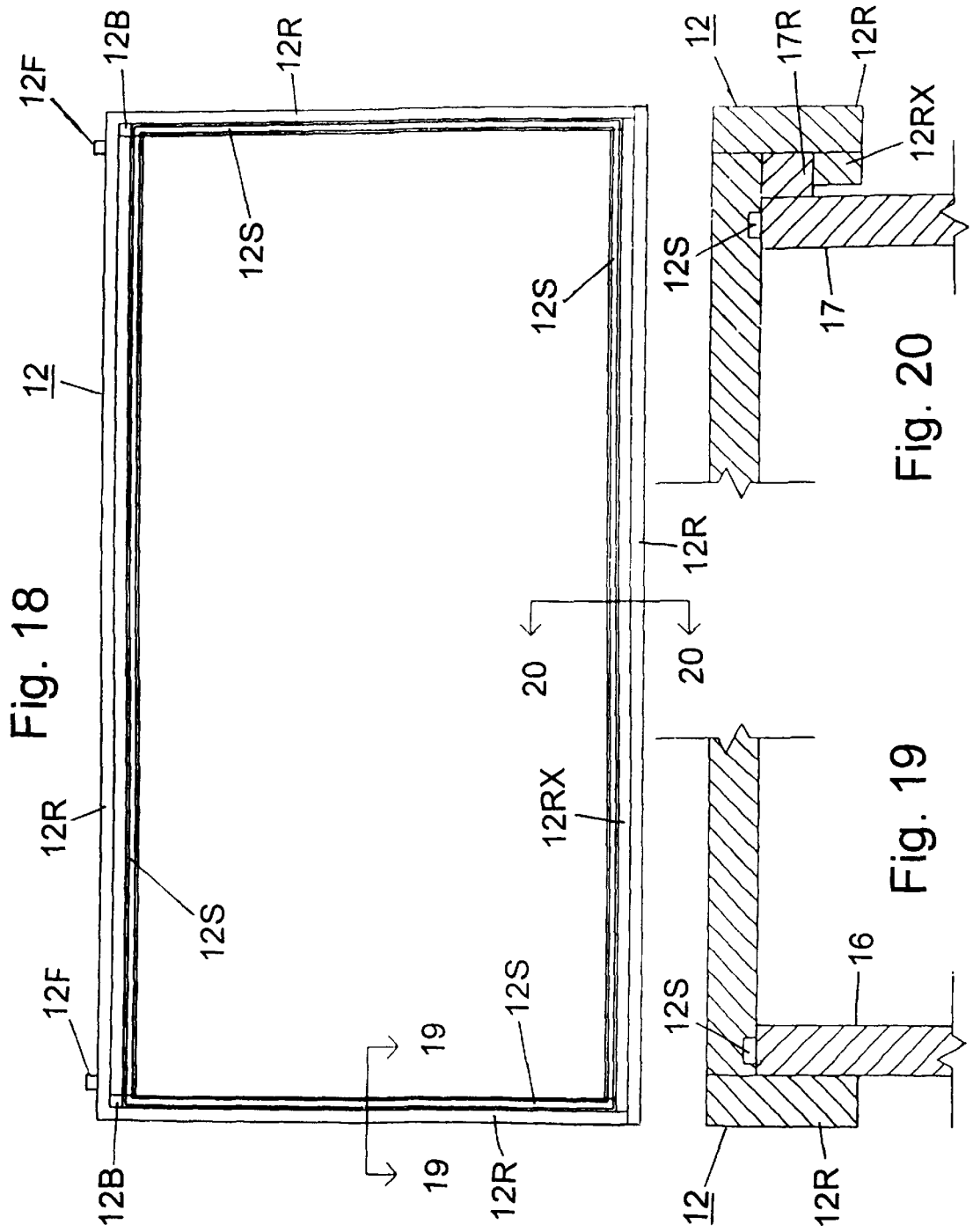

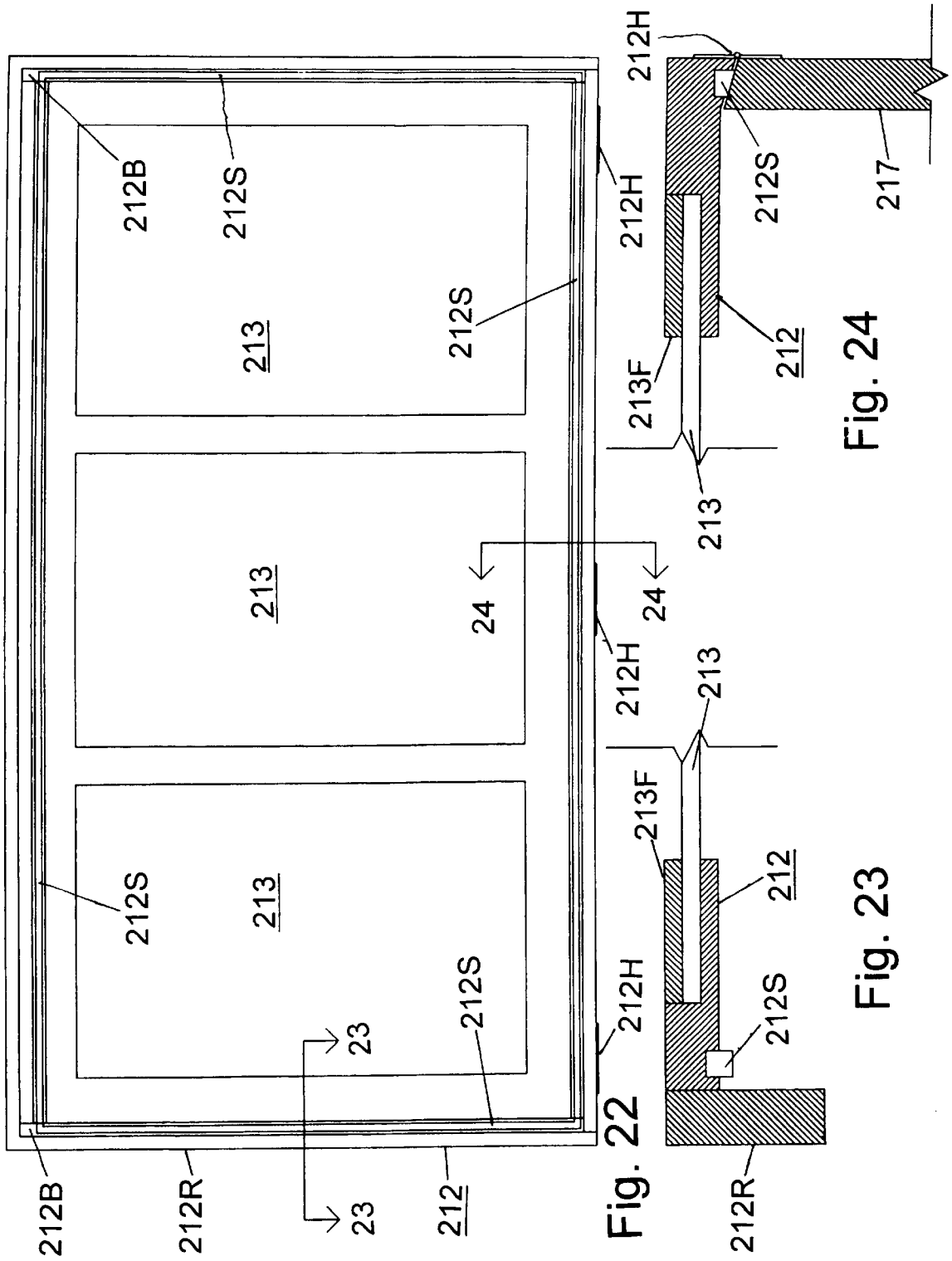

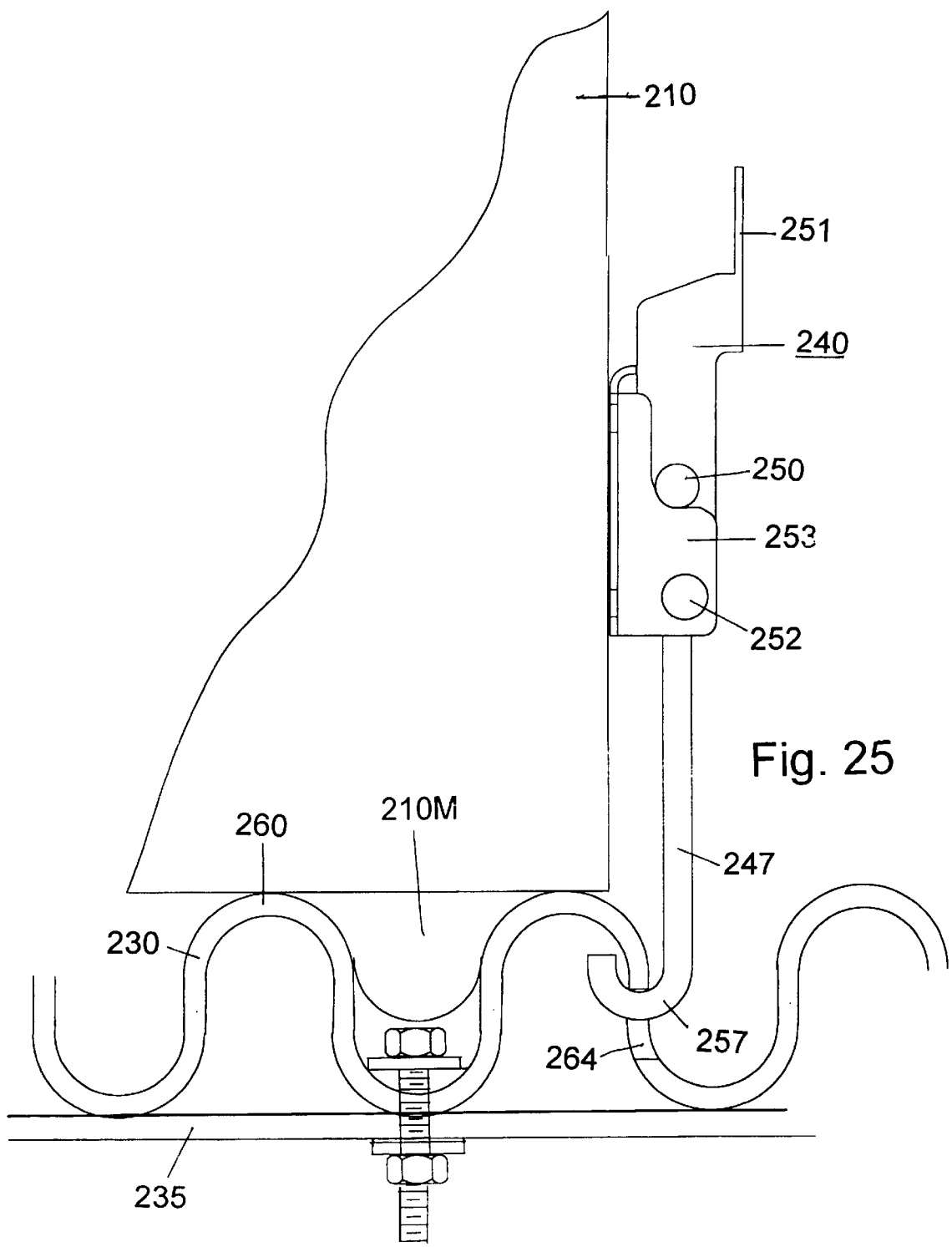

WATERTIGHT MULTI-OPENING LAND OR MARINE VEHICLE STORAGE BOX

This invention relates to a lockable waterproof tool storage box for use in a land or marine vehicle, i.e., a pickup truck. Such a box in the front end of a pickup bed has, in addition to a conventional closeable top opening, a foldable wall panel facing the pickup tailgate and foldable to a horizontal position to provide, with the top closure open, an increased laterally accessible upwardly unobstructed space within the truck bed including connected areas inside and outside of the box and particularly suited to accommodate large horizontally and/or vertically extending objects such as standard sheets of building materials or major appliances.

BACKGROUND OF THE INVENTION

Users of pickup trucks have long felt the need for a secure waterproof storage space in addition to space within the truck cab for tools or other valuable objects. It has become a common practice to secure a large box across the front end of the bed ahead of typical wheel wells to store and protect tools or other valuable personal items. Such boxes are usually at least as high as the sides of the bed and either rest on the bed floor or are suspended with end portions resting atop the bed sides. These boxes have a variety of top opening configurations. Although some suspended configurations have a space to slide a few large sheets of building material into the bed with the sheets extending beneath the suspended box, the stack height for such material is limited and the a real bed floor space occupied by such storage boxes substantially reduces the continuous bed floor spaces that is accessible vertically or from overhead. Much of this lost vertically accessible floor space has been regained with various configurations of boxes which can be folded while remaining within the truck bed. However, such folded configurations when closed for storage pose many sealing problems not only with respect to preventing entry of falling rain, but also with respect to excluding entry of standing water in a pickup bed which is poorly drained.

BRIEF DESCRIPTION OF THE INVENTION

The present invention uses a box having essentially a floor, three vertical waterproof rear and end walls relatively fixed perpendicularly with respect to the floor, a fourth wall having a front panel portion hinged to the floor at its lower edge to swing between a first position perpendicular to the container floor and a second position parallel to the container floor. The box has an openable and/or removable closure to prevent entry of rain into the area within the four vertical walls and which upon being opened or removed permits vertically unobstructed access to the box interior. The invention is particularly concerned with securing continuous waterproof sealing along the side and bottom edges of the foldable or swinging wall panel when it is in its closed vertical first position.

An object of the invention is to provide, in a strong watertight lightweight storage box for a pickup bed, a strong vertical wall panel hinged along the bottom edge of the panel to the box floor with a continuous watertight piano type living hinge enabling the wall panel to swing from a vertical position to a horizontal position.

Another object of the invention is to provide a watertight seal at the vertical edges and along the bottom of a vertical front wall panel of a pickup truck bed box wherein the wall panel may swing from a vertical position to a horizontal position within the box atop the box floor.

A further object of the invention is to provide a watertight seal for a movable vertical front wall panel of a pickup bed box wherein the seal is subject to minimum effect on its sealing properties during use involving wall panel movement in a hostile environment of dust, dirt, mud, rain and snow. Preferably the sealing surfaces of resilient sealing elements at the sides of the folding panel are protected to avoid collecting such contaminants during use or the sealing element surfaces and are provided with self cleaning means to assure optimum sealing on moving the folding panel to its closed vertical position.

The sealing structure at the ends of the front panel preferably utilize portions of the front panel which are not upwardly exposed dirt collecting surfaces when the panel is in use in its open horizontal position. This aids in preventing contamination of the seals or compromising seal integrity when the panel is moved to its vertical sealed position without having to take special care to clean the panel surface.

Another object of the invention is to provide a sealed hinge at the bottom edge of a wall panel of a pickup bed storage box which is strong and protected from physical abuse during loading and unloading of objects or material located partially or entirely within the box while the hinged wall panel is in a horizontal open position.

Another object of the invention is to provide separate physical support for the hinged panel in its vertical position to reduced the vertical physical load imposed by the panel on the continuous hinge during use of the tool box.

A still further object of the invention is to provide strong securing structure to fasten and seal a hinged vertical wall panel of a pickup truck bed box to adjacent vertical box end walls and to the bottom of the box to minimize physical abuse of the panel seals during use when only the box top is open.

Another object of the invention is to provide a relatively large size watertight storage box for a bed of a pickup truck and having at least one vertical wall panel portion which is movable from a sealed box forming position to a secondary position to provide horizontal access to at least most of the floor area of the box to supplement areas of the bed floor outside of the box to accommodate more or larger building materials or objects.

Another object of the present invention is to assure that the width of supplemental storage area made accessible within a box extending transversely of the truck bed is at least as wide as the space between the wheel wells in the pickup truck in which the box is being used.

Another object of the invention is to provide a supplemental storage box for the bed of a pickup truck which has a raisable lid which can be kept open or raised while driving the pickup and which has minimum interference with rearward vision from within the pickup cab.

Another object of the invention is to provide a pickup bed storage box with a vertically openable lid which can be raised to a vertical position generally parallel to the rear window of the pickup and which is at least partially transparent to provide minimum interference with rearward vision from within the pickup cab.

Another object of the invention is to provide a supplemental watertight storage box for the bed of a pickup truck which has a movable or removable sealed lid and a movable sealed wall enabling the interior area of the box to be added to the external area to provide greater vertically unobstructed usable space within the pickup bed.

Another object of the invention is to provide a supplemental watertight storage box for the bed of a pickup truck which is openable to provide a vertically unobstructed walk-in floor area having a non-skid walking surface.

It is also an object of the invention to provide an all weather waterproof storage box having an openable vertical door panel with pressure equalization between the inside and outside of the box as external environmental conditions such as sun, shade, temperature, rain and wind change and effect such equalization at a protected location near the top of the box to prevent pressure differentials from affecting the integrity of waterproof sealing strips around openable door and lid parts.

Another object of the invention is to eliminate the need for bridging strength in a sealed storage box because no large bottom floor portions of the box are suspended above the supporting vehicle surfaces.

This invention provides a sealable waterproof storage container having a plurality of sides enclosing a waterproof storage area with the sides defining a peripheral edge of a top access opening into the storage area. A flat closure for the top access opening is opened by removal or by pivoted movement and is provided with a depending drainage lip or rail and is sealed to the container around the top access opening. Preferably the sides include a flat bottom and a flat vertical rigid panel having a straight horizontally extending elongated bottom edge at the bottom of said storage area. The panel is hinged to the container bottom by means of a continuous waterproof one-piece plastic hinge extending the length of the panel's bottom edge and supporting the panel for swinging movement between its vertical position and a horizontal position to provide a further access opening into the container interior. The top edge of the panel defines part of the peripheral edge of the top access opening. The panel has two opposite side edges extending vertically between respective ends of the bottom edge and the top edge of the panel. The container has first and second rigidly supported structures extending along the respective panel side edges when the panel is in its vertical position. At each of the panel side edges there is a clampable sealing structure comprising a compressible waterproof sealing strip between the panel side edge and the rigidly supported structure, each sealing strip being in sealing engagement with a respective end of said waterproof hinge to completely seal the side and bottom edges of the panel when the panel is in its vertical position. A tight seal along these edges is attained by means of a clamping mechanism for simultaneously exerting clamping forces on each of the side sealing structures when the panel is in its vertical position to maintain a continuous waterproof seal around the sides and along the waterproof hinge at the bottom of said panel from one end of said top panel edge to the other end of said top panel edge. The seals around the top closure and around the vertical panel prevent entry of water and foreign contaminants into said storage container when said clamping forces are exerted on the panel in its vertical position and the closure is secured over the access opening.

The above and other objects and features of the invention may be achieved by providing a hinged front wall panel of a pickup truck storage box which is foldable from a vertical sealed box forming position to a horizontal position within the box atop the bottom of the box. This front wall panel has a horizontal bottom edge connected along its entire length to the box floor by a waterproof continuous or living hinge which is externally unexposed when the front panel is in its vertical or erect position. The box has end walls provided with inwardly extending vertical jambs against which the ends of the front panel are clamped when the box is closed and sealed. Sealing means in the form of vertical resilient strips in jambs for the front panel are provided along the end edges of the front panel between the panel and stationary portions of the box. These strips cooperate with the waterproof hinge in a mutually engaging sealing relationship to completely seal the box at the end and bottom peripheral edges of the front panel.

The front panel structure, the waterproof hinge and the jambs are of sufficient strength to enable the panel to be strongly secured by suitable clamping means to maintain the physical integrity of the box and preserve its watertight integrity during use of the box when the panel is in its vertical position. This may include hinge structures of additional strength outside and beyond the sealed areas around the panel to aid in pivotably supporting the panel. When the panel is in its horizontal position the jambs are kept from moving relative to the floor and other box walls and from moving relative to each other by structural features of the box floor and walls so that the structural integrity of the box is independent of the position of the front panel.

The top or lid closure of the box is movable from a closed position in which it is sealed watertight against the top rectangular perimeter of the edges of the four vertical box walls to an open position in which it may be hinged at the rear wall or to which it may be removed and remotely stored.

The sealing structure at the ends of the front panel preferably utilize portions of the front panel which are not upwardly exposed dirt collecting surfaces when the panel is in use in its horizontal position. This aids in preventing contamination of the seals or compromising seal integrity when the panel is moved to its vertical sealed position without having to take special care to clean the panel surface.

The continuous hinge at the lower edge of the front panel may be a continuous extruded, rolled and suitably formed plastic member of uniform cross section with a thin narrow strong flexible fatigue-resistant central longitudinal portion enabling a right angle bend with a very small radius of curvature between two parallel heavier longitudinally extending strip portions suitably configured for convenient attachment to the panel and to the box floor, respectively, by suitable adhesive, clamping, plastic welding or other suitable attachment means. If the box is molded of plastic material, one or both of the relatively hinged strip portions of the hinge may be formed by being integrally molded into or integrally with appropriate portions of the box. One strip may be molded into or integrally with the panel allowing the panel to be attached to the box by suitable attachment of the other strip to the floor of the box.

BRIEF DESCRIPTION OF THE DRAWINGS

FIG. 1 is a perspective view of a closed storage box of the invention in the front end of a pickup truck., the box having an openable top and an inwardly and downwardly swingable front wall door panel which is openable to an open horizontal position atop the box floor.

FIG. 2 is a view similar to FIG. 1 but with the box removed from the truck and the closure lid of the box removed and showing draw type latches holding the door panel closed and illustrating a detachable ramp to be used as a loading aid.

FIG. 3 is a view similar to FIG. 2 but with the front hinged door panel of the box swung down to an open position inside the box to lie atop the floor of the box.

FIG. 18 is a view of the underside of box lid of FIG. 1 and showing a continuous sealing strip embedded in a retaining groove in the lid and protruding from the inner face of the lid in a planar rectangular pattern to form a waterproof seal against the tops of the door and other walls of the box of FIGS. 1–10 when the lid is fastened shut.

FIG. 19 is a section on line 19—19 of FIG. 18 showing a section of the lid seal for engaging the top of the left box end wall.

FIG. 20 is a section on line 20—20 of FIG. 18 showing a section of the lid seal for engaging the top of the rear box end wall and showing a clamping overhang at the rear edge of the lid to fit around a lid retaining horizontal rail extending along the top of the outer rear box wall face.

FIG. 22 is a view of the underside of box lid of FIG. 21 and showing a continuous sealing strip embedded in a retaining groove in the lid and protruding from the inner face of the lid in a rectangular pattern to form a waterproof seal against the tops of the door and other walls of the box of FIG. 21 when the lid is fastened shut.

FIG. 23 is a section on line 23—23 of FIG. 22 showing the protruding sealing strip and the mounting of the edge of one window pane.

FIG. 24 is a section on line 24—24 of FIG. 22 illustrating one of multiple hinge connections along the rear box wall between the lid and rear box wall and a section of the sealing strip extending along the top rear wall of the box.

FIGS. 25–27 illustrate three alternative embodiments of the invention in which a storage box is secured to a bedliner floor which is in turn secured to a truck bed floor, each box being provided with quick-releasable fastening devices.

DETAILED DESCRIPTION OF THE INVENTION

Figure 2A:
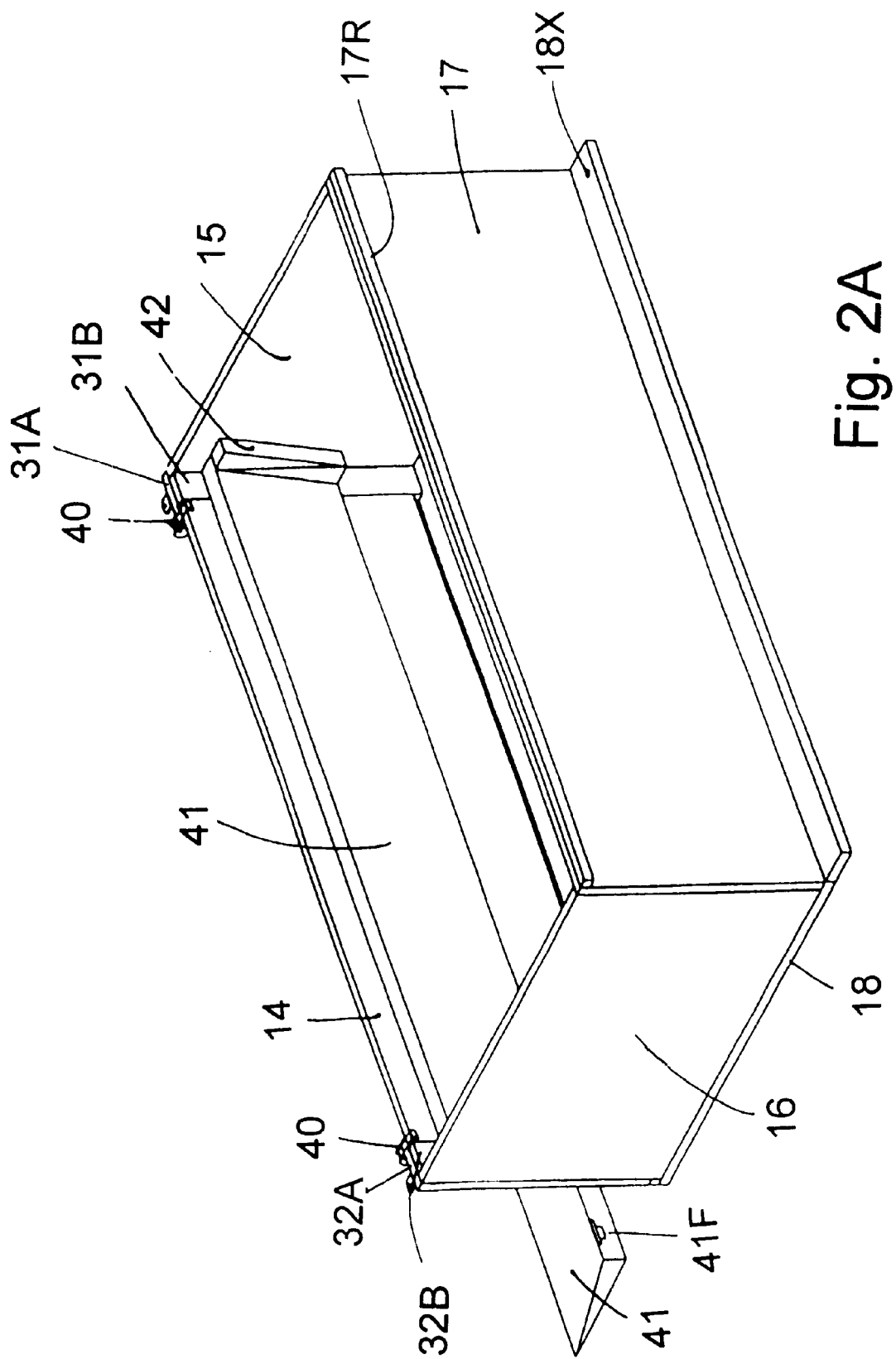
FIG. 2A is a perspective view looking into the box of FIG. 2 from the rear and illustrating the detachable ramp of FIG. 2 in a stored position where it assists the latches to bar opening of the door panel.

All of the following descriptions relating to structures at one end of the storage boxes are representative of mirror image structures at the other end of the boxes which are symmetrical about a vertical front to rear center planes.

FIG. 1 illustrates a storage box 10 located in a conventional pickup truck 1 at the forward end of a pickup truck bed 3 on the bed floor 4 between the bed side rails 5 and ahead of the wheel wells 6 near the front end wall 7 of the truck bed. The box 10 provides for safe and environmentally protected storage of tools or other valuable objects. The box has a sealed waterproof protective drop-on closure 12 secured to the box at the level of the tops of the side rails 5 and front bed wall 7 just below the pickup cab window 8 to prevent rain or other contaminants from entering the box 10. A front wall 13 forming part of the box 10 includes a sealed front door panel 14 hinged at its lower edge to swing rearwardly into the box 10 when the closure 12 is opened or removed.

FIG. 2 is a view similar to FIG. 1 with the protective closure 12 removed and more completely showing, in addition to front wall 13, two parallel left and right end walls 15 and 16 spaced from but parallel to the truck bed sides 5 and a rear wall 17 near and parallel to the front end wall 7 of the truck bed. These box walls enclose and extending upwardly from the bottom wall or floor 18 of the box. FIGS. 2 and 2A show an external horizontal extension 18X coplanar with the box bottom 18 and along the bottom of the rear wall 17. This extension may be provided to keep the rear wall 17 spaced a sufficient distance from the front end wall 7 of the truck bed 3 to provide a storage space between the box 10 and bed wall 7 for the lid 12 when the lid is removed from the box 10.

The hinged door panel section 14 of the front wall 13 is hinged and connected along its bottom edge to a sill structure 19 on the floor bottom wall 18 of the box to provide means for swinging the door panel 14 from the position of FIG. 2 downwardly and rearwardly into the box atop the box floor 18 to the door position as seen in FIG. 3. A flat filler member 20 shown in FIG. 3 may be laid between the door and rear wall to level the bottom interior of the box 10.

Figure 2B:
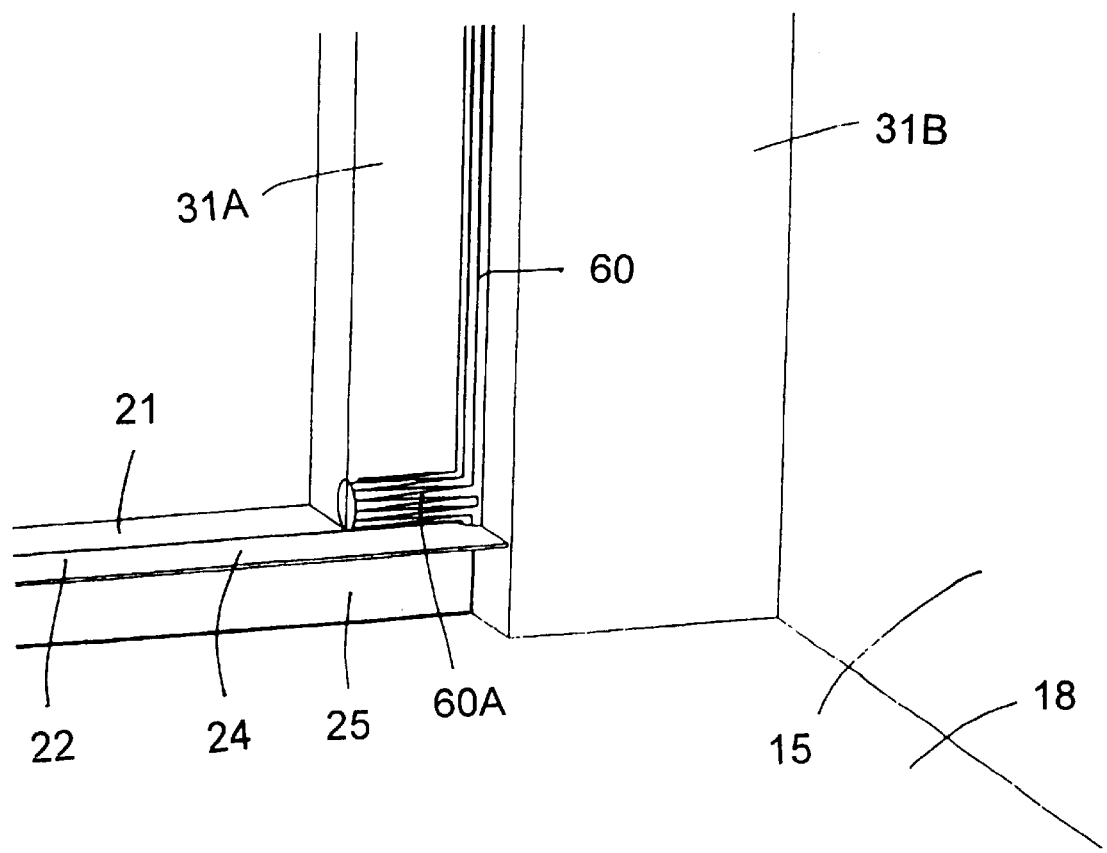
FIG. 2B is a partial perspective view looking into the left front corner of the box with the door omitted from its supporting hinge and showing door sealing and hinging details.
Figure 5:
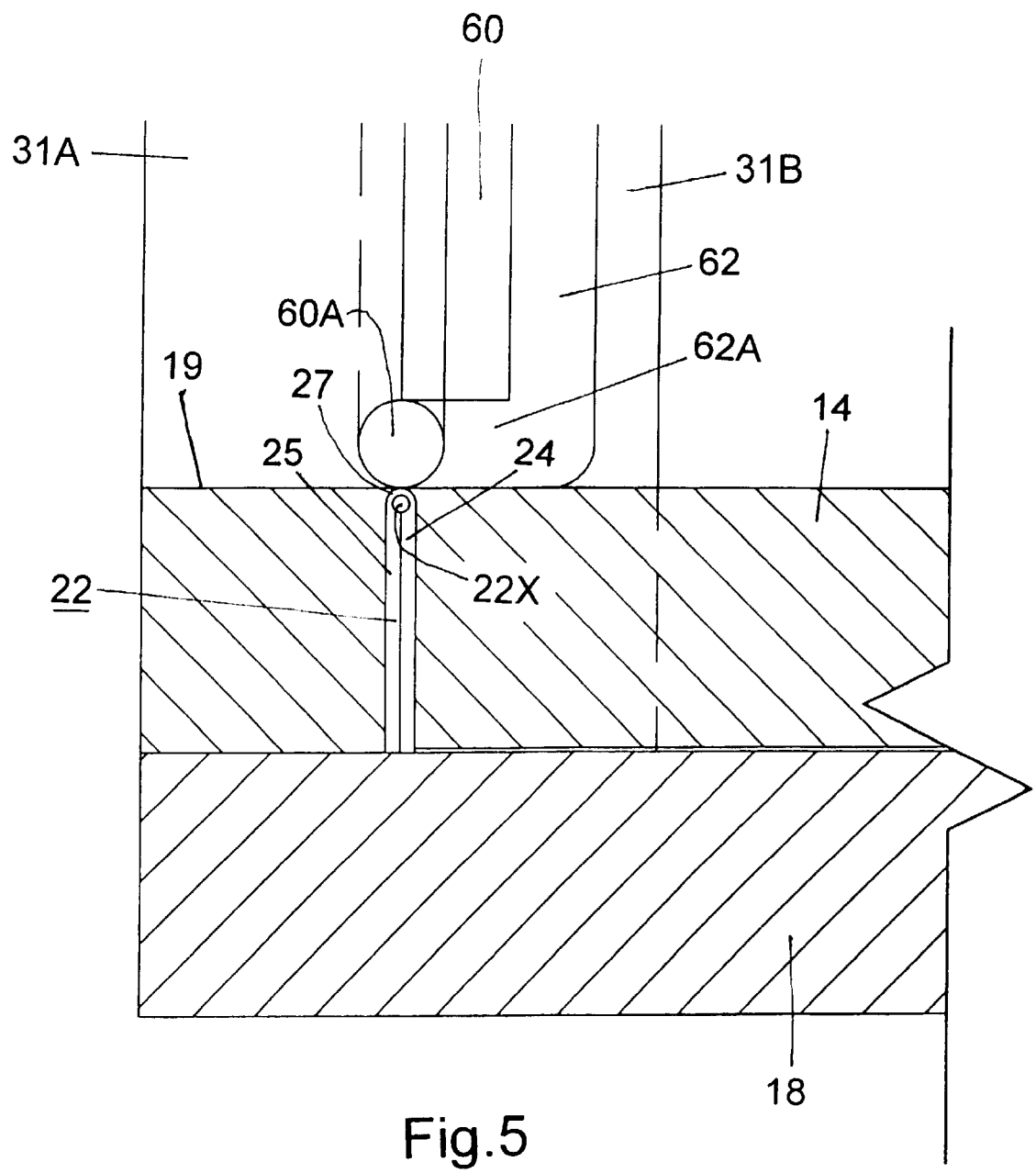
FIG. 5 is a vertical section at line 5—5 of FIG. 4 in a plane perpendicular to the door panel hinge axis at the lower end of the door jamb at one end of the door panel to illustrate multiple door edge sealing strips having segments in sealing relationship with one end of the hinged edge of a continuous plastic piano-type hinge door panel hinge while the door is in its open position.
Figure 6:
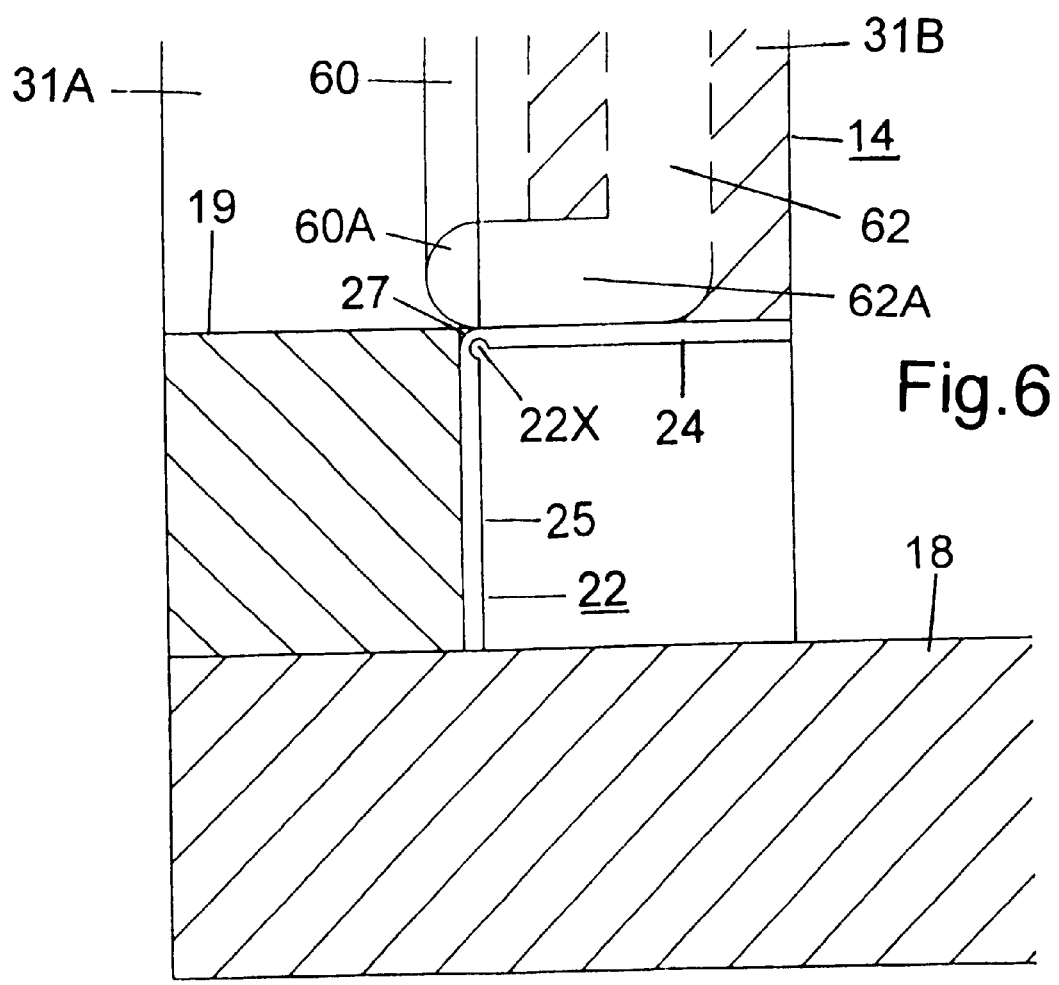
FIG. 6 is a section similar to FIG. 5 but with the door in its closed position.

The door 14 is pivotably supported, secured and sealed along its entire lower edge near the front edge of the box floor 18 by means including a sill strip 21 secured to the box floor and a sealing waterproof continuous or living piano-type hinge member 22 having a hinge point axis 22X and pivotably interconnecting the bottom edge face of door 14 along its entire length to a vertical rear face portion of the sill strip 21 in a relationship described in connection with FIGS. 2B, 5 and 6. The hinge 22 includes two thin relatively hinged flat relatively foldable continuous strips 24 and 25 of uniform thickness interconnected for relative 90 degree movement by a continuous thinner web 27 extending the length of the hinge. In the closed position of door 14, strips 24 and 25 are parallel and side by side as seen in FIG. 5 with the web 27 extending in about a 180 degree arc. In the open position of door 14, strips 24 and 25 are perpendicular to each other as seen in FIGS. 2B and 6 with the web 27 extending in about a 90 degree arc. The door's hinge axis 22X is at or near the center of curvature of the hinge web 27. The strips 24 and 25 are connected to the door and sill members respectively by means of suitable adhesive, clamping, plastic welding or other suitable attachment means to achieve the desired relative 90 degree angular movement.

Figures 5A, 6A:
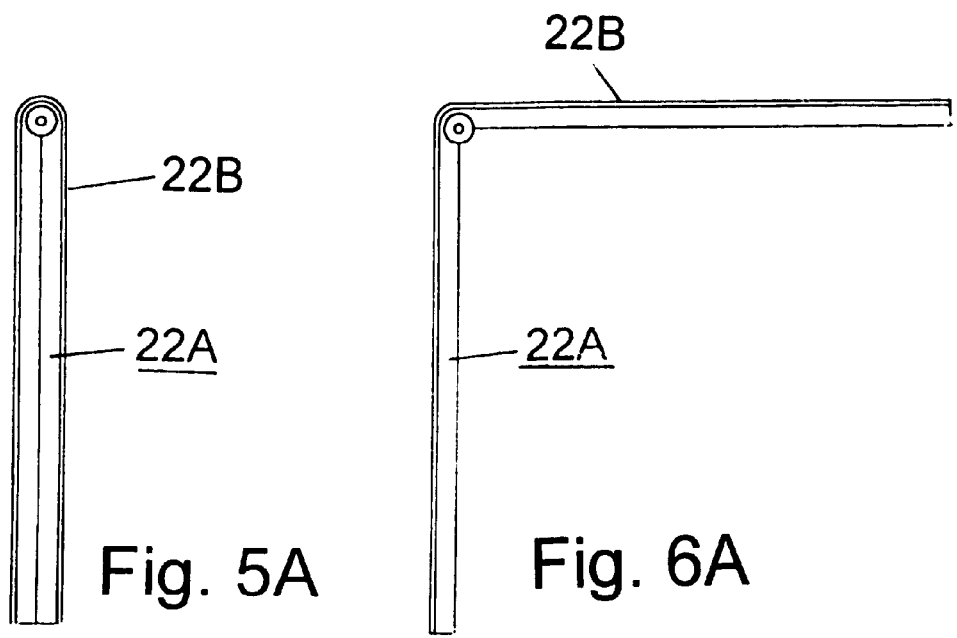
FIG. 5A is a view similar to FIG. 5, but showing a section of a piano hinge covered with a flexible waterproof sealing membrane which extends the length of the lower door edge.
Figure 7:
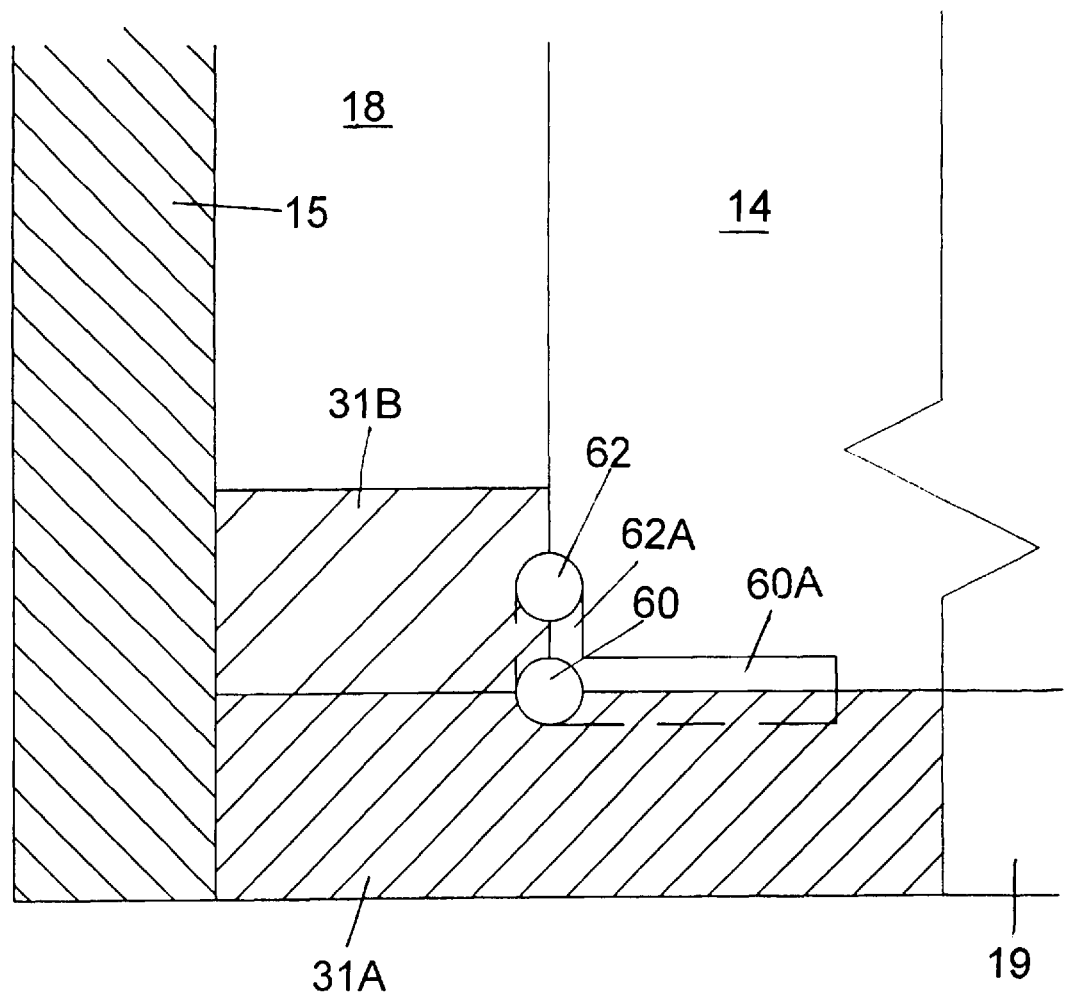
FIG. 7 is a section on line 7—7 of FIG. 4 in a horizontal plane parallel to the box floor and illustrating multiple door edge sealing strips within a doorjamb when the box door is in its open position.

Although the hinge strip 22 is preferably made of a one-piece member of strong durable relatively inexpensive water impermeable plastic material, similar sealing can be obtained along the bottom edge of the door using a similar thin strong mechanical piano-type hinge 22A covered with a suitably attached water impermeable membrane 22B providing a waterproof surface as seen in FIGS. 5A and 6A.

At opposite end of the box front wall 13 left and right doorjamb structures 31 and 32 extend inwardly toward each other to provide anchoring support and sealing means for opposite ends of the door 14 when it is in its closed erect vertical position. The jambs 31 and 32 have forward vertical members 31A and 32A against the rear of faces of which the front faces of the opposite door ends are in sealed abutment. The jambs 31 and 32 also have rear vertical members 31B and 32B close to and also in sealed relationship to end faces of the opposite door ends. The jambs 31 and 32 are provided with sealing means which extend the entire vertical heights of the door ends and which are in sealing relationship by direct engagement, or by intermediate sealing means, with the sealing surfaces of the hinge at the bottom corners of the door 14 so that there is a continuous waterproof seal down each edge and across the bottom of the door when it is closed.

Figure 9:
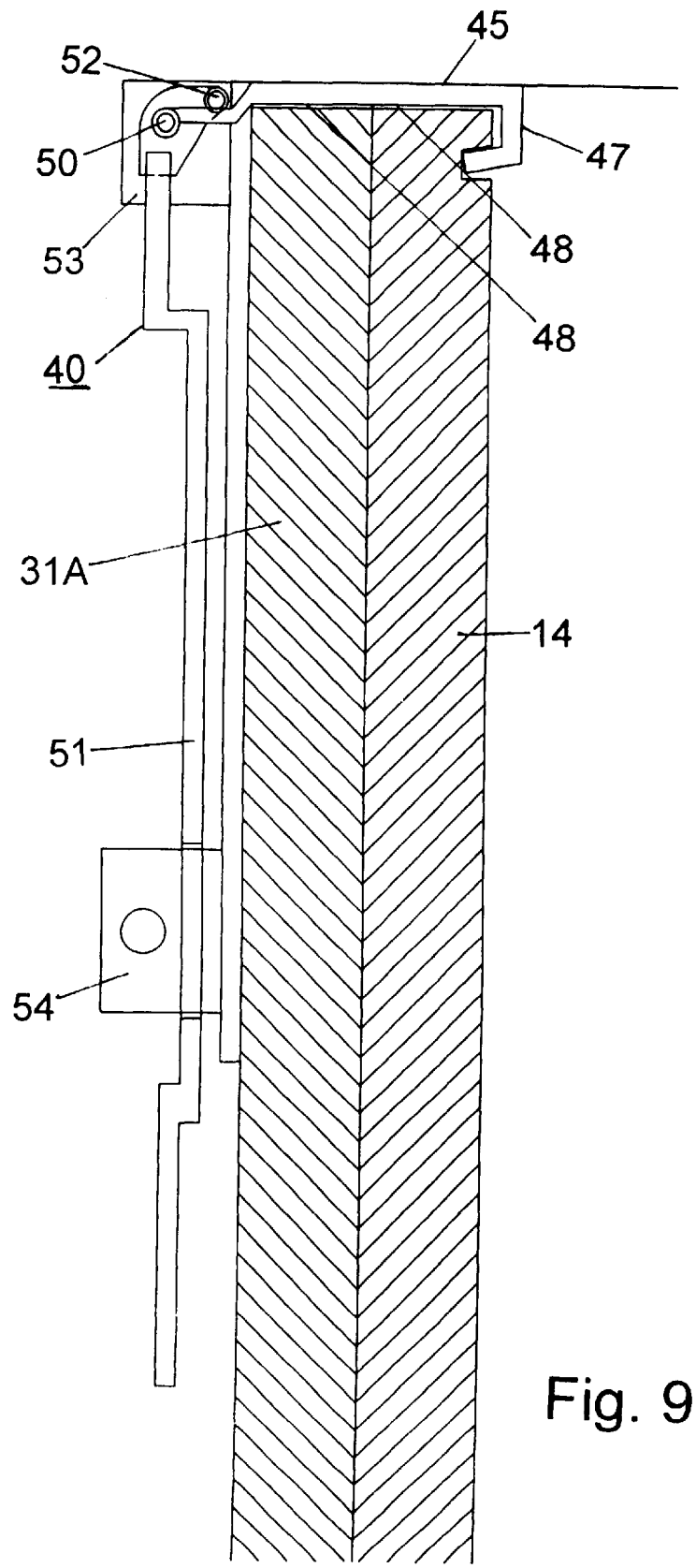
FIG. 9 is a vertical section on line 9—9 of FIG. 4 with the doorjamb and door partially cut away to show a lever actuated draw type latching mechanism for supporting and securing the door in a closed position.
Figure 10:
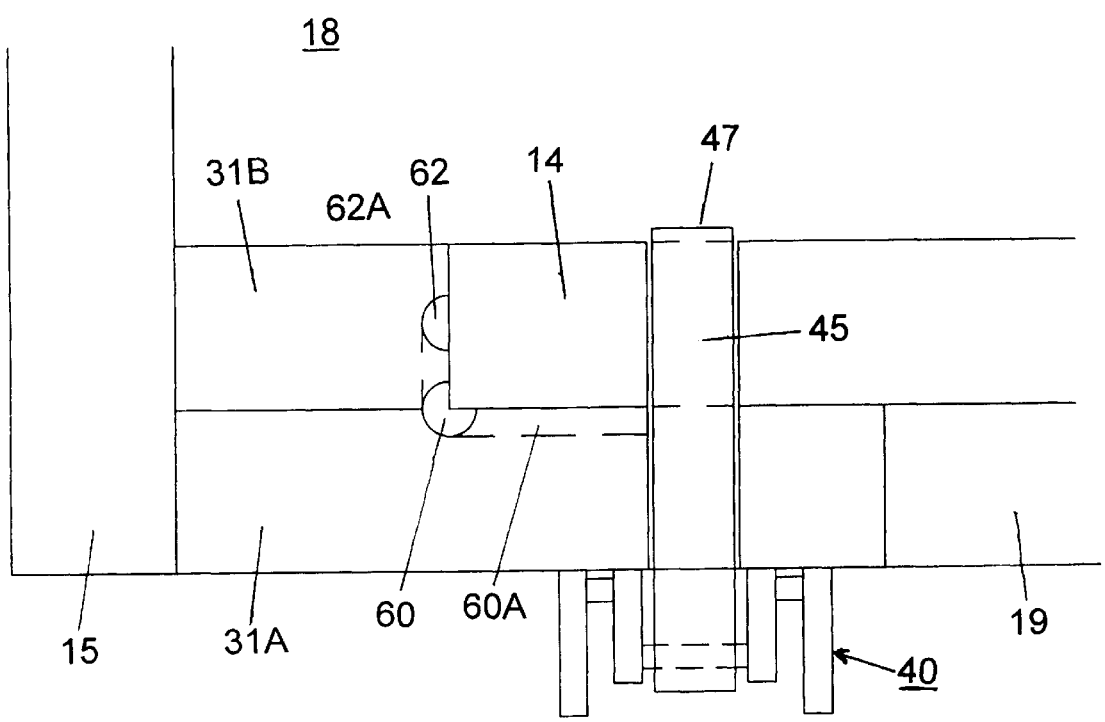
FIG. 10 is a top view of FIG. 4 further illustrating the draw type door latch mechanism.

The principal door supporting and clamping means to hold the door 14 in its closed sealed position includes a draw type latch mechanism 40 secured to each of the jamb members 31A and 32A which is constructed to clamp the door 14 against these jamb members. These latch mechanisms are described in detail in the descriptions of FIGS. 4, 9 and 10 below.

Another means for retaining the box door 14 in a tightly sealed relationship in the front wall 13 is a ramp 41 shown in one position as a loading aid in front of the box in FIG. 2 and as a locking bar within the box holding the door closed as seen in FIG. 2A. The ramp 41 seen in front of the box 10 in FIG. 2 is provided to facilitate moving articles into the box when the door is in the horizontal position of FIG. 3. When the door is in the FIG. 3 position the ramp 41 may be removably secured to the box 10 by means of detachable fasteners 41F connectable between the ramp 41 and the box floor 18. The ramp 41 has a wedge shape cross section and at least at its thickest longitudinal side has a length equal to the distance between the box end walls 15 and 16. As seen in FIG. 2A, these box end walls have inclined ramp retaining members 42 and 43 with downwardly and forwardly inclined front surfaces which allow the opposite ends of ramp 41 to be wedged between the retaining members 42 and 43 and the jamb members 31B and 32B to retain the door 14 in the closed position of FIGS. 2 and 2A.

Each latch mechanism 40 has a door retaining and supporting toggle member 45 with a flat blade-like lever portion 46 resting atop a respective jam member 31A or 32A and the door 14 and a hook portion 47 engaging a recess at the rear face of the door 14. The lever portion fits in notches 48 in the top edges of jamb member 31A and the door 14 so that no portion of the latch mechanism is higher than the top edges of the box sides. Entrance of water into the box through these notches when the door and lid are closed is prevented by an overhanging drip rail from the lid extending to a level below the notches. The notches provide means for equalizing pressure between the inside of the box and the outside environment as the environmental conditions change.

Although the notches 48 do not provide an absolute barrier to entrance of water into the box, they are a practical deterrent to minimize entry of water. For a more absolute waterproof barrier, the lever portions 46 may be sealed to fill any voids around them in the notches 48. To keep the box watertight but enable pressure equalization, one or more round holes a few inches in diameter may be made in the more protected rear box wall 17 and closed with air pervious and water impervious membrane material to prevent large changes in temperature from affecting the integrity of the box seals. A material like expanded polytetrafluoroethylene (ePTFE) laminates may be selected to meet expected environmental conditions. Suitable perforated round plates may be added on both sides of the material for physical protection.

The toggle member 45 is pivotably connected at the end opposite to the hook portion 47 at a swingable pivot axis 50 on a latch actuating lever member 51 which in turn is pivotably supported at a fixed pivot axis 52 on a stationary latch bracket 53 secured to the respective jamb member. The portion of the upper end of the lever 51 between the axes 50 and 52 forms a toggle member which cooperates with the retaining toggle member 45 to form an over-center toggle structure to hold the door closed when the hook 47 is engaged behind the door and the actuating lever 51 is in the position of FIG. 9 and retained there by any suitable means. When the lid 12 is open or removed the lever 51 may be swung clockwise through an arc which will move the pivot axis 50 up and around the stationary pivot 52 allowing the hook 47 to be released from behind the door. The pivot axis 50 is held down by lever 51 in the configuration of FIG. 9 which in turn causes the hook 47 at the opposite end of toggle member 45 to exert an upward supporting force on the door 14. The lower end of the lever may form a hasp receiving a staple 54 through which can be passed a suitable locking device. Alternatively the actuating lever may be held against movement enabling door release by having an overhanging portion of the lid preventing swinging of the lever when the lid is closed and preferably locked.

The jamb members 31 and 32 are each stepped along their vertical length to provide a corner or recess facing the interior of the box 10 to accommodate and hold, by any suitable configuration of the jamb cross section, vertically extending resilient sealing strips 60 and 61 against which is clamped the outer vertical edge of the door panel when closed to form a vertical watertight seal. The lower end of the strips 60 and 61 are bent to extend horizontally toward each other with short segments 60A and 61A respectively lying above and resting in contact with the ends of the hinge fold at the rear of the lower ends of the inside faces of the jamb members 31 and 32.

For clearer illustration of the relationships of the hinge, sealing and door jamb structure at each end of the door see FIG. 2B which is a view looking into the lower left corner of the box with the door 14 omitted, only for the purpose of illustration, from its closed position atop the hinge strip 24. The jamb members 31A–31B and 32A–32B are provided with cooperating recesses or notches along the height of the closed door position to form a grooved retaining means to accommodate the respective vertical resilient closed cell compressible sealing strip 60 or 61 of tough durable water impervious foam plastic mater and having round cross section. The strip should remain resilient throughout a wide range of expected environmental temperatures. A protruding portion of about one quarter of each strip 60 or 61 extends outside the retaining groove into an area to be engaged by the front vertical door edge when it is moved to the closed door position. During such movement the door edge compresses the strip 60 or 61 and essentially pushes it into the groove substantially reducing its volume by about 25 percent.

At the bottom end of strip 60 or 61 the horizontal portion 60A or 61A, with a length of about several diameters from the jamb member 31B or 32B, lies in a horizontal recess or groove in the jamb member 31A or 32A and has a semicylindrical portion extending or protruding from the groove to likewise be engaged by the lower front corner face of the door 14 when moved to its closed position. Each of these horizontally extending seal strip portion 60A or 61A overlies and is in cooperating sealing relationship with an end of the web 27 at the top of the hinge 22. When the door 14 is closed the seal strip portion is compressed into its retaining groove means and downwardly with increased pressure on the end of the hinge to assure complete continuous sealing along the sides and bottom of the closed door. A suitable flexible adhesive seal may also be used to bond the surfaces of the seal strips and the hinge 22 without interfering with swinging movement of the panel 14 between its open and closed positions.

Although a single vertical sealing strip 60 is shown in FIG. 2B at one side of the door opening and a like strip 61 is used at the opposite side of the door, it is preferred that additional parallel sealing strips be used at each side of the door 14 as shown at 62 in FIGS. 5–8 and 10 as described below. The strip 62 is embedded and retained in a vertical central groove in the side of jamb member 31B and has a lower end bent to extend horizontally forwardly to contact and be in cooperative sealing relationship with the folded top end portion of the hinge 22. The strip 62 has a dynamic sliding sealing relationship with the door end as the latter slides past and in contact with the strip 62 to its closed position in clamped sealing abutment with the sealing strip 60.

Figure 4:
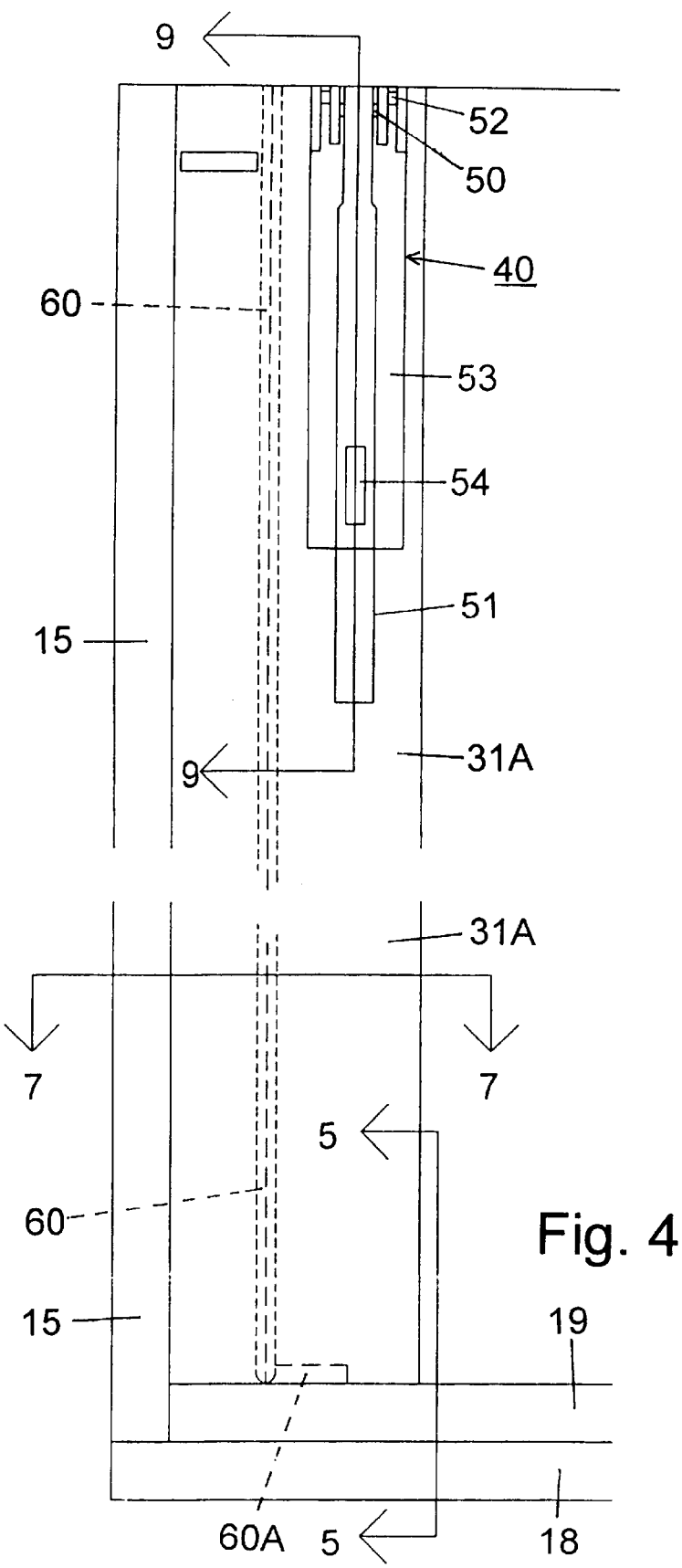
FIG. 4 is an enlarged front view of the left end of a pickup box and provides reference for the description of FIGS. 5–10.

FIG. 4 is a front view of the doorjamb at left end of the front wall 13 of the Box shown in FIGS. 2 and 3 and the sections thereon show the loci for the sections of FIGS. 5–9 depicting details of sealing means, hinging means and securing means for the door panel 14 in its closed and open positions.

Figure 8:
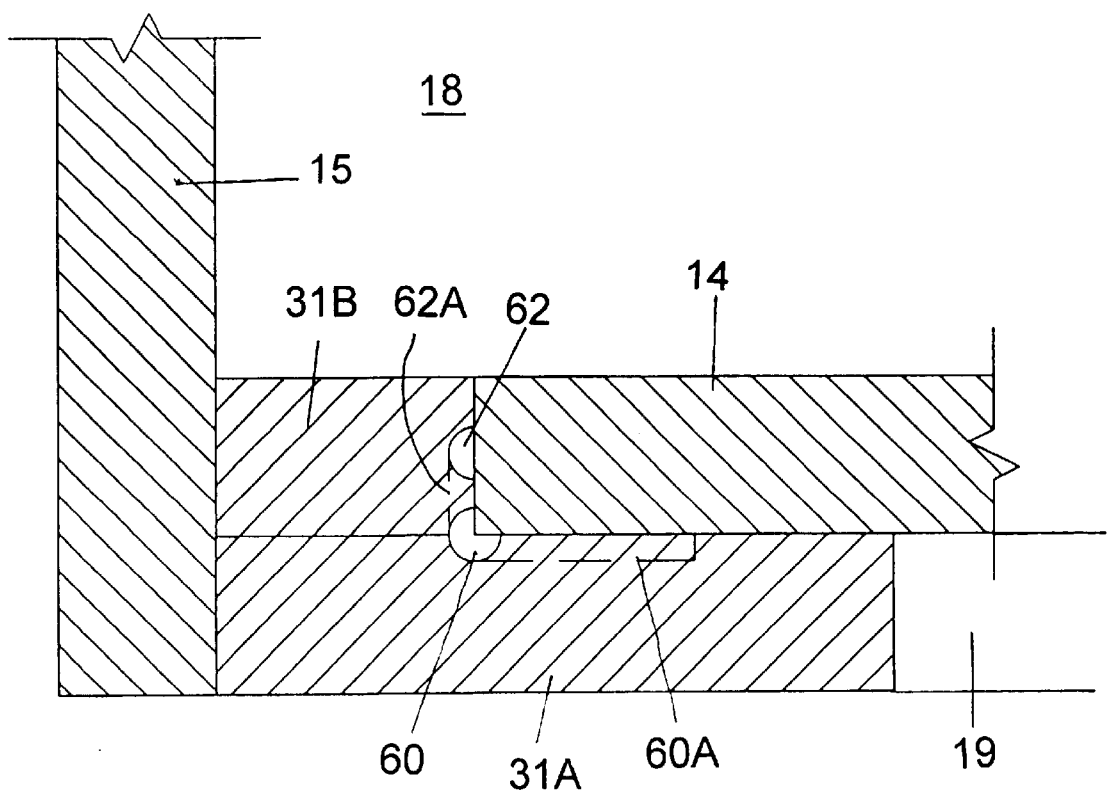
FIG. 8 is a section similar to FIG. 7 in a horizontal plane parallel to the box floor and illustrating the configuration of multiple door edge sealing strips within a door jamb and sealed against a door edge when the door is in its closed position.

In the erect closed door position of FIG. 2 the door, hinge and sealing components assume a relationship with respect to the left jamb structure 31 of FIG. 4 as see in FIGS. 6 and 8. In the open door position of FIG. 3 the door, hinge and sealing components assume a relationship with respect to the left jamb structure 31 of FIG. 4 as see in FIGS. 5 and 7.

FIG. 6 shows a section through the hinge member 22 with the hinge point axis 22X near the right angle junction of the edges of the two hinged strips 24 and 25, strip 24 being secured by suitable means to the bottom surface of the vertically extending closed door panel 14 and strip 25 being secured by suitable means to the rear vertical surface of the small sill member 21. The height of sill 21 and width of hinge strips 24 and 25 are essentially equal to the thickness of the door panel 14. The hinge point axis 22X extends longitudinally adjacent the upper rear corner of the sill member 21 at the center of curvature of the narrow longitudinally extending hinge web portion 27 which has a reduced thickness extending through an angle of about 90 degrees as seen in FIG. 6 to facilitate bending of the hinge 22.

FIG. 3 is a view similar to FIG. 2 but shows the panel 14 in the position it assumes when swung downwardly and rearwardly into the box 10 from its position in FIG. 2 through an angle of ninety degrees about the hinge point axis 22X to lie atop the bottom of the box 10. During this swinging movement the hinge point axis 22X remains adjacent the upper rear longitudinally extending corner of the sill member 21 and still at the center of curvature of the narrow longitudinally extending portion of the hinge which is of reduced thickness. This swinging movement of the panel 14 brings the faces of the hinge strips 24 and 25 into abutment and the web portion of the hinge member 22 which has a reduced thickness is wrapped further to extending through an angle of about 180 degrees around the hinge point axis 22X.

In FIGS. 3 and 5 the upper surfaces of the open door panel 14 and of the sill member 21 are coplanar and the hinge, although slightly exposed as seen most clearly in FIG. 5, nevertheless remains just below these coplanar upper surfaces and is unlikely to be damaged by objects sliding across the tiny gap between the sill member 21 and the panel 14.

An alternative embodiment of the invention shown in FIGS. 11–17 differs from that of FIGS. 1–10 by having the front door panel 114 swing outwardly from its erect position to a horizontal position outside the storage box 110. Part which are identical have the same reference numbers whereas similar parts have 100 added to the reference number.

Figure 11:
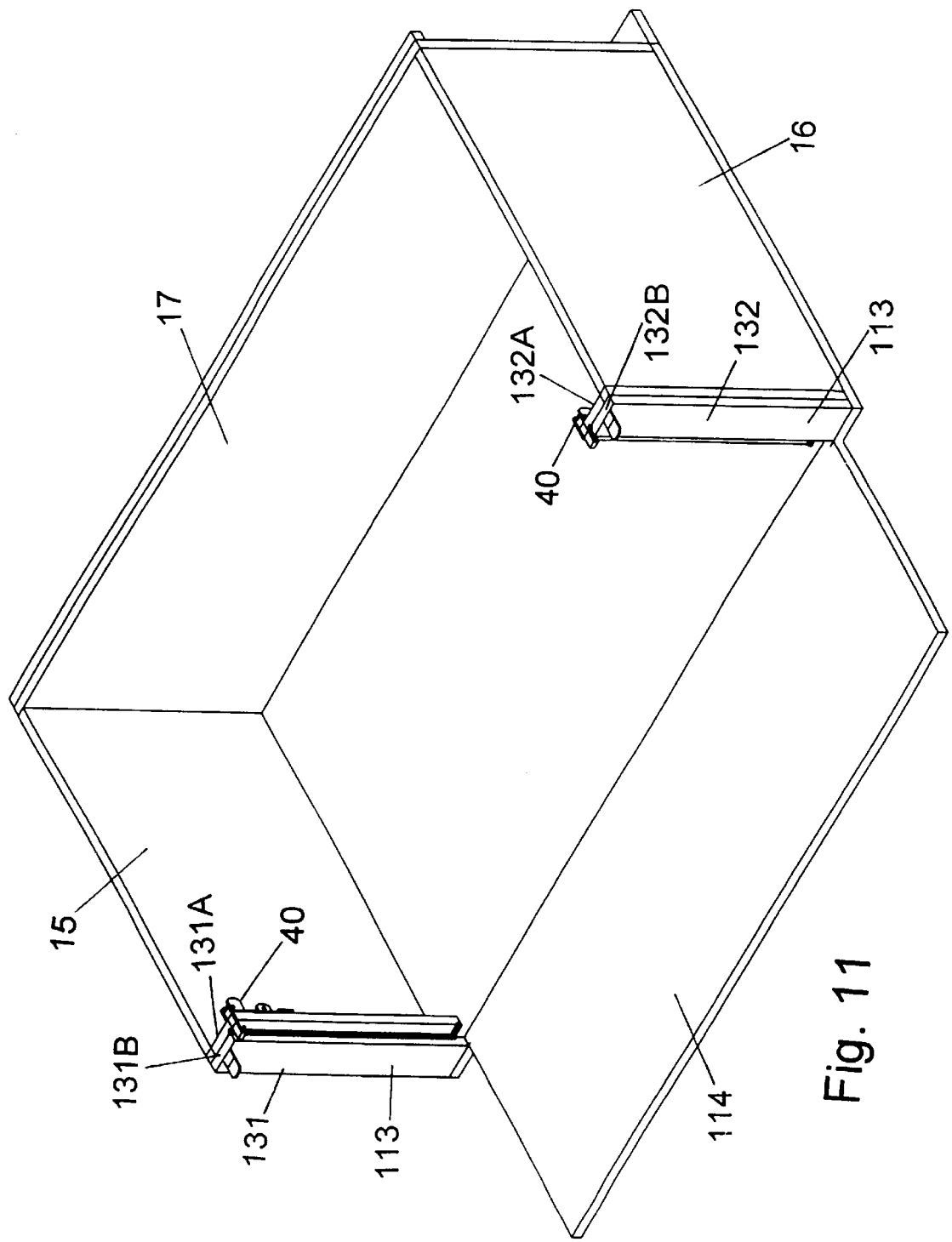
FIG. 11 is a perspective view of an alternative box embodiment with the door arranged in an outwardly opened horizontal position with the top of the door coplanar with the top face of the box floor.
Figure 11A:
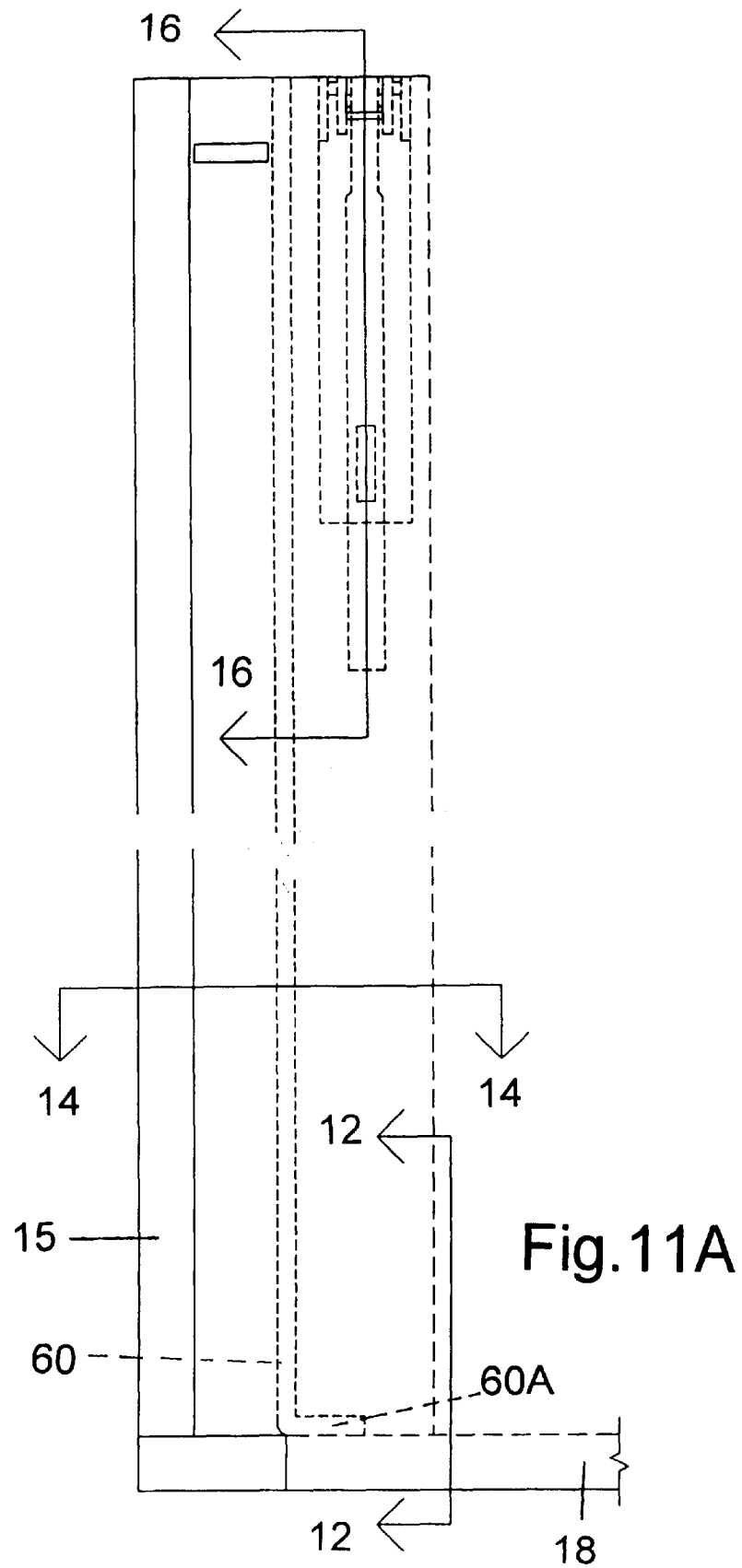
FIG. 11A is an enlarged front view of the left end of the pickup box embodiment of FIG. 11 and provides reference basis for the description of the section views of FIGS. 12–16 and of the partial tup view of FIG. 17.
Figure 12:
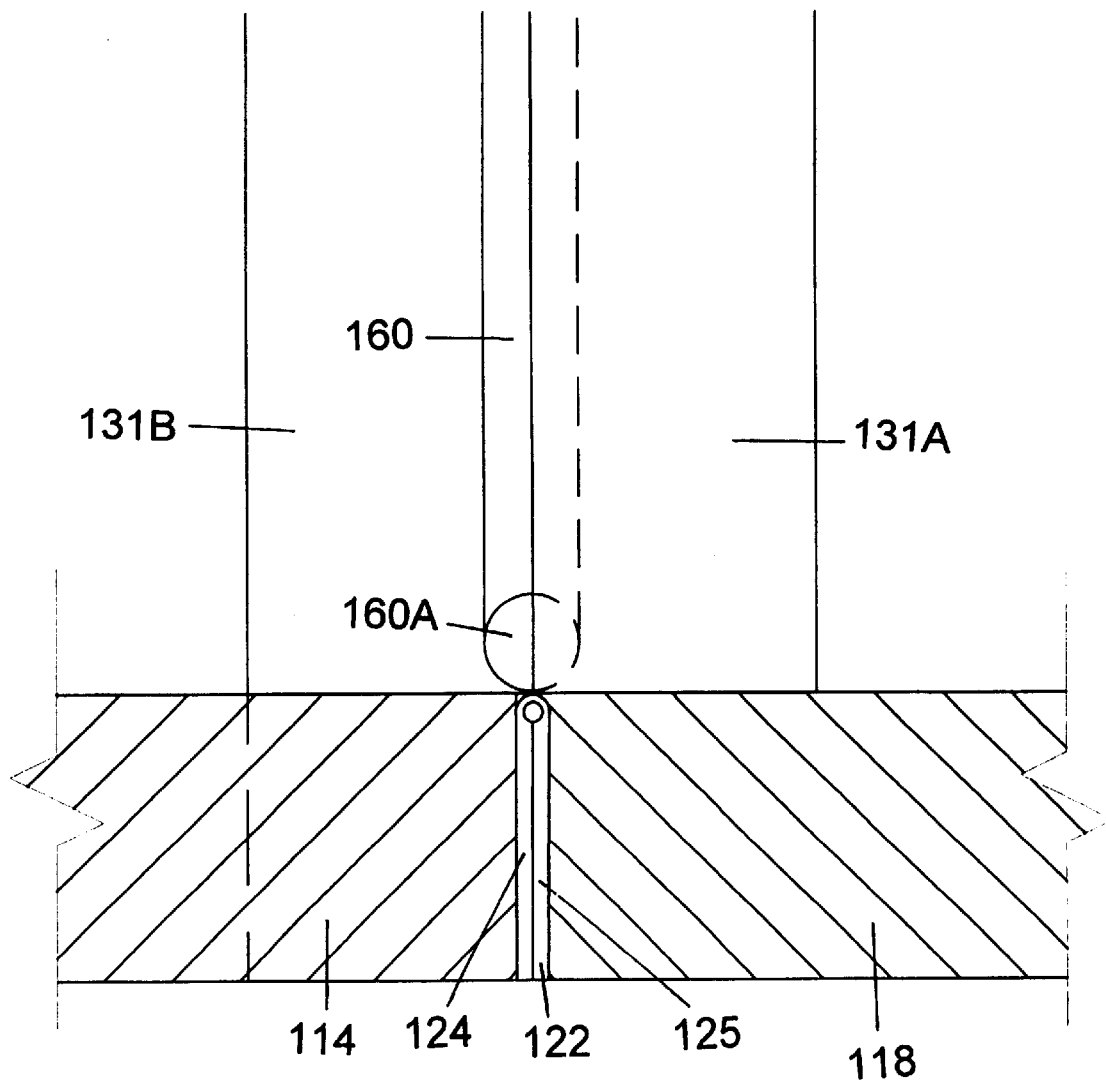
FIG. 12 is a vertical section at line 12—12 of FIG. 11A in a plane perpendicular to the door panel hinge axis at the lower end of the door jamb at one end of the door panel to illustrate a door edge sealing strip in sealing relationship with one end of the hinged edge of a continuous plastic piano-type door panel hinge while the door is in the outwardly open position of FIG. 11.
Figure 13:
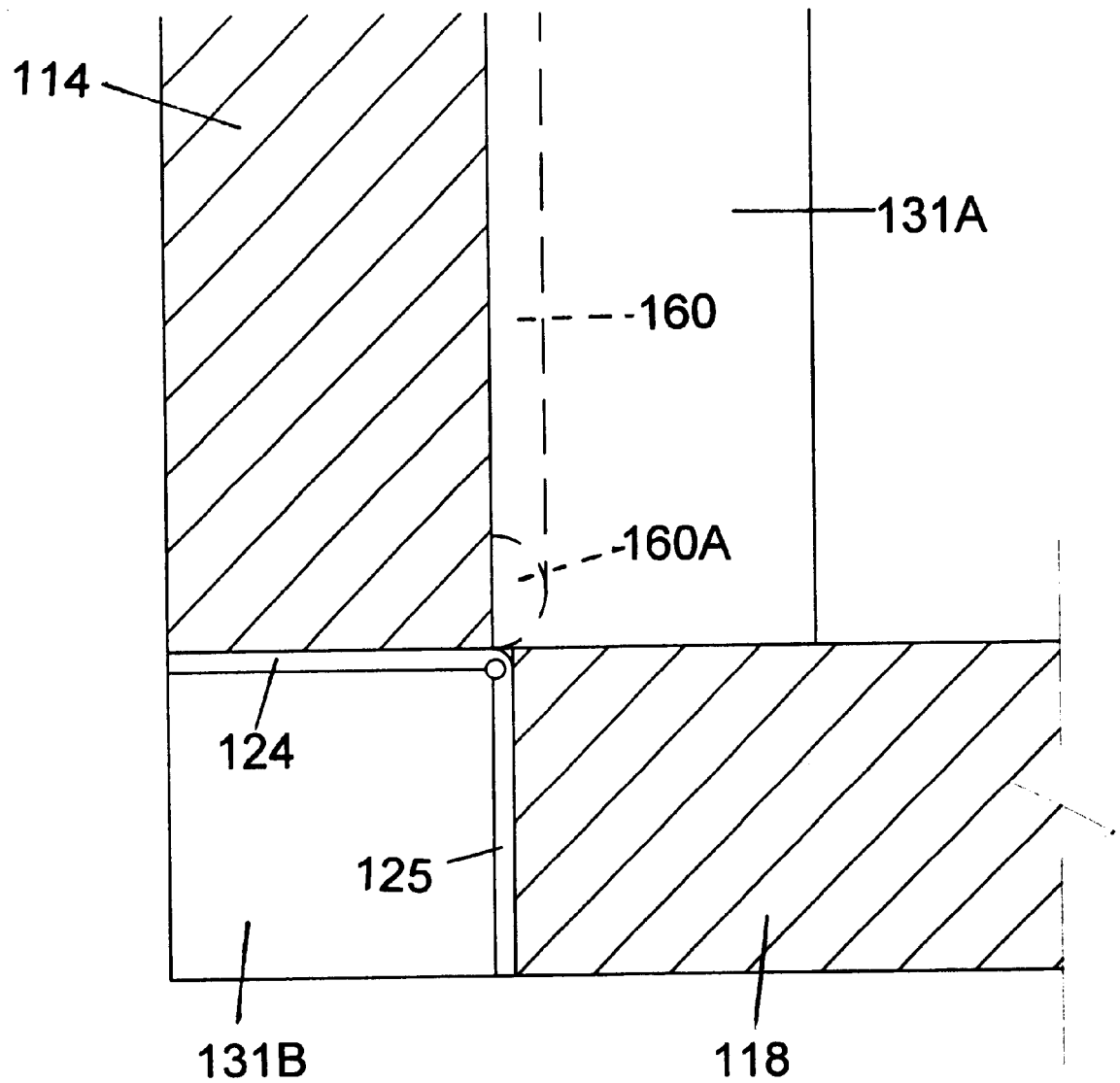
FIG. 13 is a section similar to FIG. 12 but with the door in its closed position.
Figure 14:
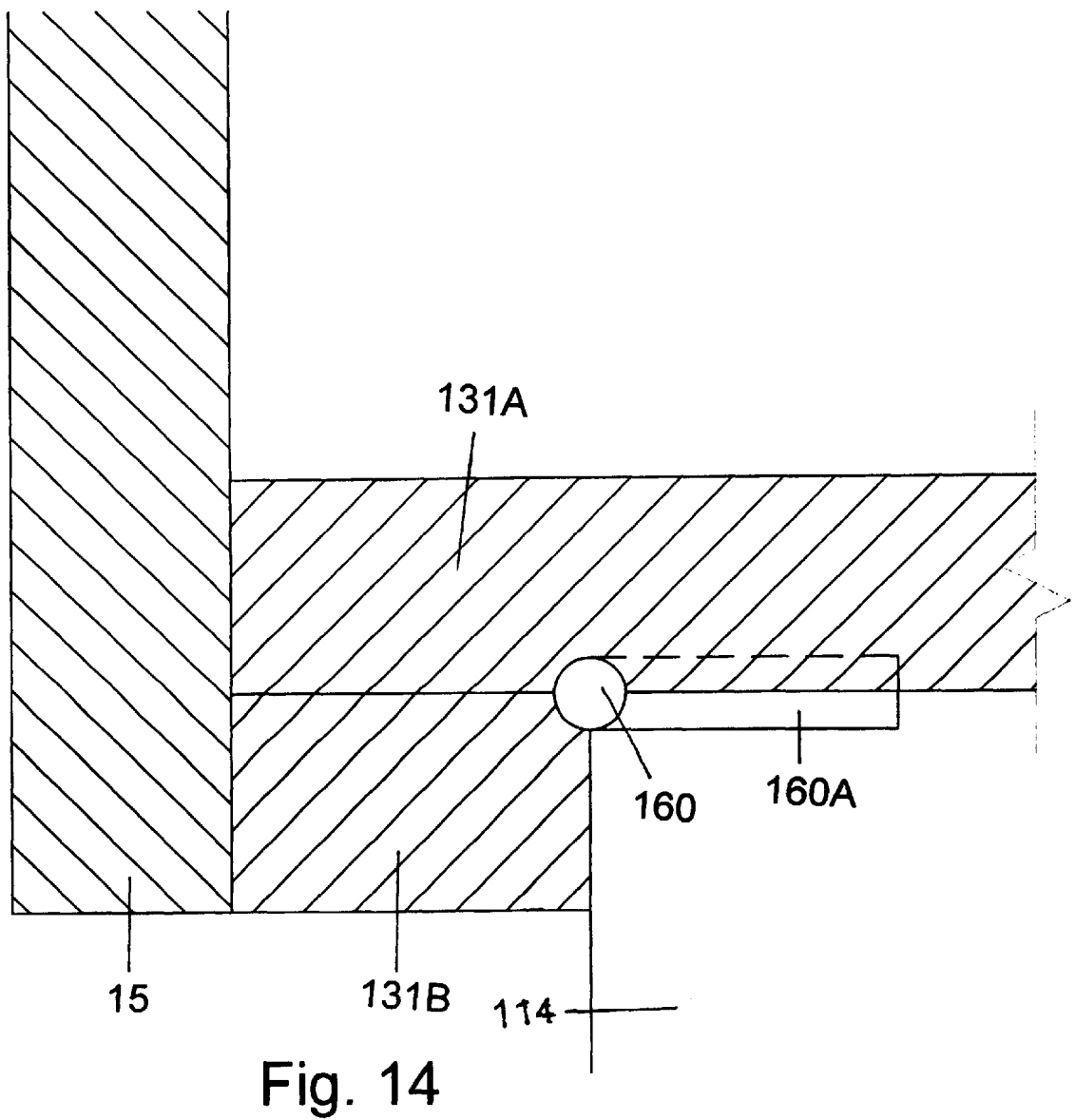
FIG. 14 is a section on line 14—14 of FIG. 11A in a horizontal plane parallel to the box floor and illustrating a door edge sealing strip within a door jamb when the box door is in its open position of FIG. 11.
Figure 15:
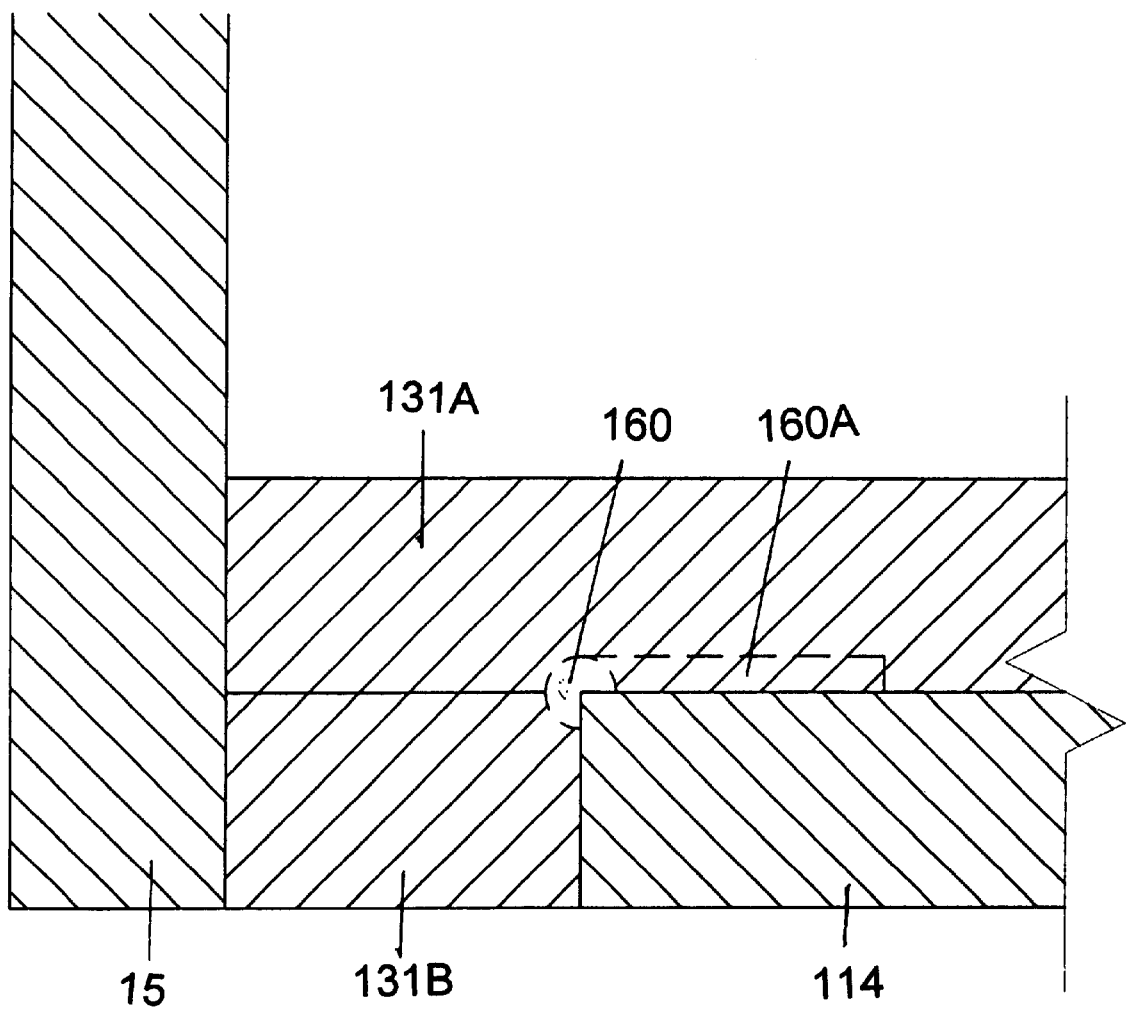
FIG. 15 is a section similar to FIG. 14 in a horizontal plane parallel to the box floor and illustrating the configuration of a door edge sealing strips within a doorjamb and sealed against a door edge when the door is moved from the outside position of FIG. 11 to its closed position.
Figure 16:
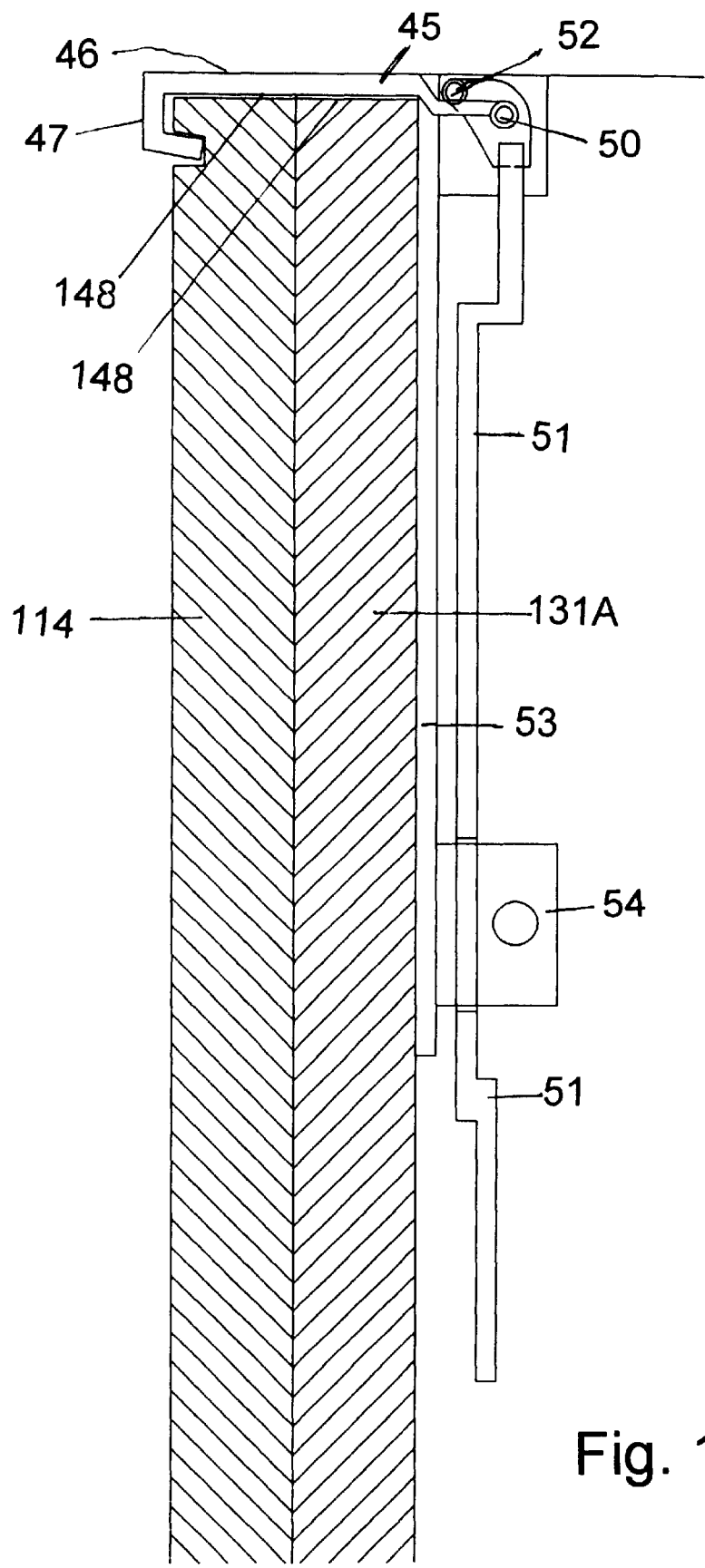
FIG. 16 is a vertical section on line 16—16 of FIG. 11A with the door jamb and door partially cut away to show a lever actuated draw type latching mechanism located within the storage box for pulling the door inwardly against the front wall of the box and securing it a closed vertical position.
Figure 17:
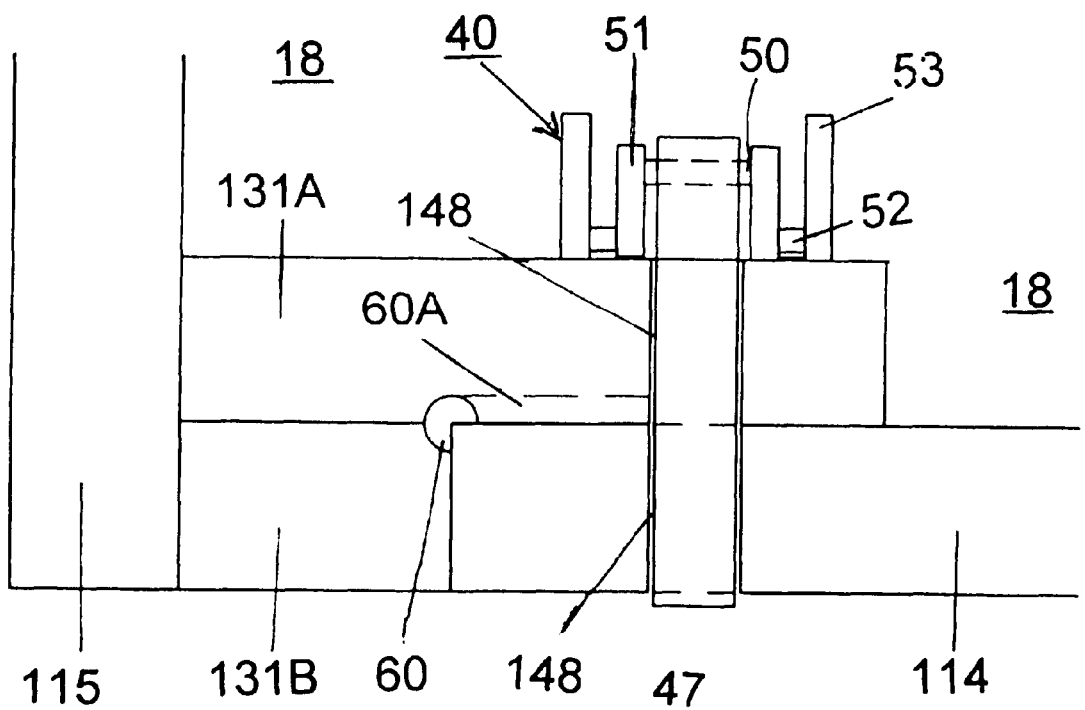
FIG. 17 is a top view of FIG. 11A and further illustrating the draw type door latch mechanism located within the box.

The function and structure of the latching mechanism 50 to hold the door closed and sealed remains the same in FIG. 11*a* and the related sections referenced therein as in FIG. 4 and the related sections referenced therein. However, in this modified embodiment the latch mechanism 50 is mounted on the inside of an inner jamb member 131A of the door jamb 131 as seen in FIGS. 11, 11A, 16 and 17.

In FIGS. 11, 11A, 12 and 13 it is seen that there is no sill member and the door panel 114 is hinged directly to the front edge of the box bottom or floor 118.

The door panel 114 is supported and retained in its closed position in sealing relationship in the front box wall 113 between door jam strictures 131 and 132. The closed door panel lies between and in sealing relationship with the front narrow doorjamb members 131B and 132B. The closed door abuts in sealing relationship the front faces of the wider doorjamb member 131A and 132A.

In FIGS. 12, 13, 14 and 15 a single sealing strip 160 is shown with a lower short horizontal bent end 160A and it is retained in a recess in the corner between jamb members 131B and 131A for sealing against the door and against the closed end of the hinge. This combination of parts and sealing functions is essentially the same as achieved with the sealing strip 60–60A in the embodiment of FIGS. 5, 6, 7 and 8 respectively. This sealing combination may also include a second sealing strip generally parallel to the strip 160–160A in the same relationship that strip 61–61A has to the strip 60–60A and to the continuous hinge 22 in FIGS. 5–10.

The lower or under side of the box closure 12 for FIGS. 1–10 is shown in FIG. 18 where a continuous sealing strip 12S is held embedded in a retaining groove in the lid and protruding from the inner face of the lid in a planar rectangular pattern to form a waterproof seal against the tops of the door and other walls of the box of FIGS. 1–10 when the lid is downwardly clamped in its closed position and fastened shut.

FIG. 19 is a section on line 19—19 of FIG. 18 showing the lid seal 12S close to a peripheral lid drip rail portion 12R for engaging the top of the left box end wall 15. Along the rear of the lid 12 the drip rail 12R is provided with a horizontally inwardly directed rail extension 12RX which is intended to underlie the outer rail 17R along the top edge of the rear wall 17 as seen in FIGS. 2 and 2A. The lid is secured to the box 10 by sliding the lid rail extension 12RX under the rear wall outer rail 17R and pulling the lid 12 forward to a position where the spacer blocks 12B at the inside front corners of the lid 12 drop over the front edges of the end walls 15 and 16 to assure that the front portion of drip rail 12R will be immediately in front of the latch mechanisms 40 when the lid is closed and secured with the sealing strip 12S pressed into engagement around its periphery with the top edge portions of the box walls 13–17. Suitable lockable lid fasteners 12F retain the lid 12 in sealed relationship on the box 10.

Figure 21:
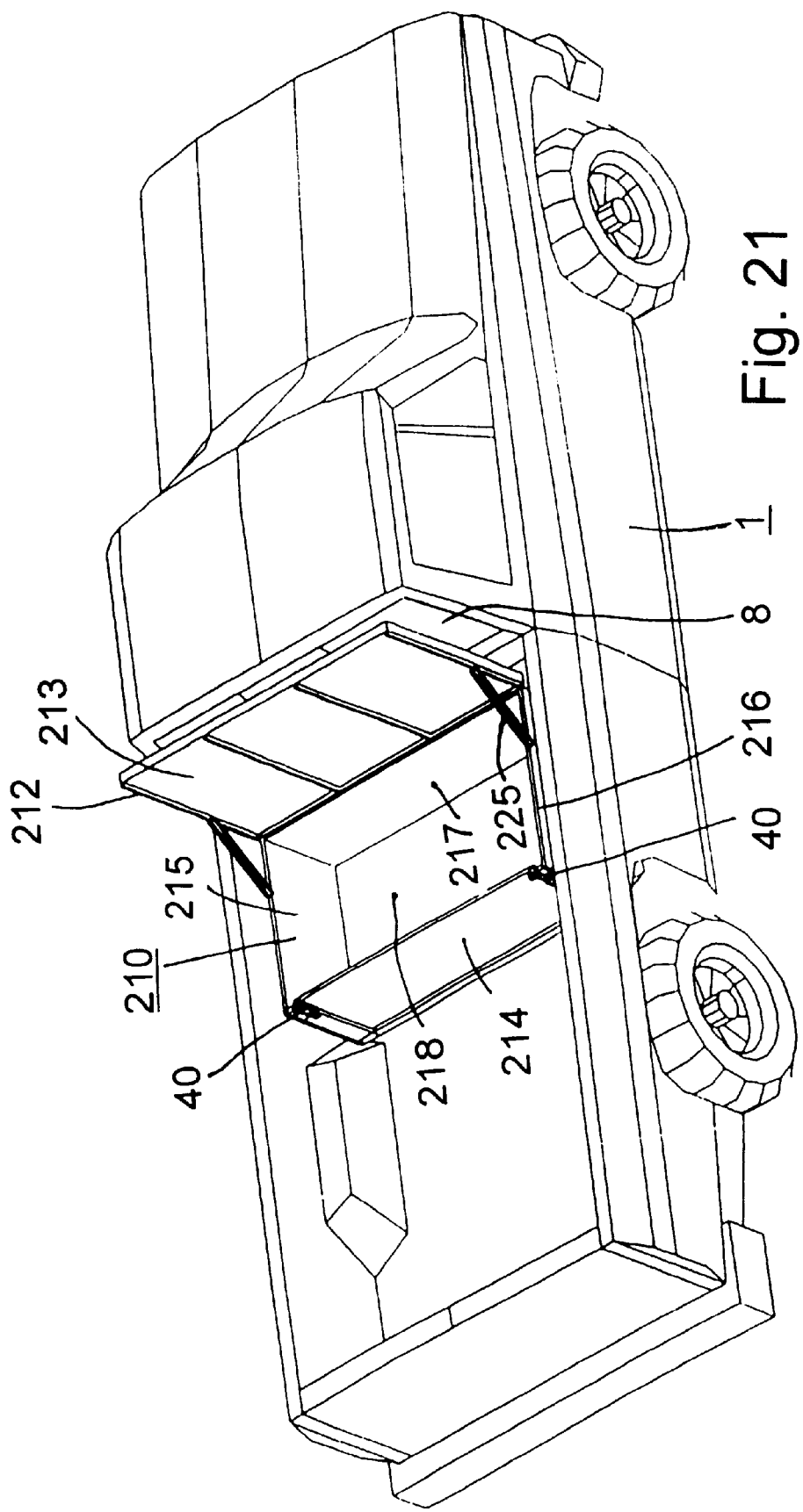
FIG. 21 is a perspective view of an alternative box embodiment in a pickup truck bed but showing a multi-pane window in an open box lid which is hinged to the upper edge of the rear box wall and extends parallel to and behind a rear window of the pickup cab to enable rearward visibility from the cab.

Another embodiment of the invention for use in the truck 1 is shown in FIGS. 21–24. FIG. 21 is a perspective view of this alternative box 210 located at the front end of the pickup truck bed 3 and shown with a multi-window panes 213 in an open box lid 212 which is hinged to the upper edge of the rear box wall 217 and extends parallel to and behind a rear window 8 of the pickup cab. This windowed lid 212 is provided with releasable latchable lid props 225 at each end of the box 210 to secure the lid 212 in a vertical position parallel to the cab windows 8 when desired during use of the truck 1. The windowed lid 212 enables rearward visibility from the cab.

FIG. 22 is a view of the underside of box lid of FIG. 21 and showing a continuous sealing strip 212S embedded in a retaining groove in the lid and protruding from the inner face of the lid in a rectangular pattern to form a waterproof seal against the tops of the door panel 214 and other walls 215 and 216 of the box of FIGS. 21–24 when the lid is fastened shut.

FIG. 23 is a section on line 23—23 of FIG. 22 showing the protruding sealing strip 212S where it lies just inside the depending drip rail 212R to engage the top flat edge of the left end wall 215 of the box 210. This relationship of the sealing strip 212S and drip rail 212R in the section of FIG. 23 is also used along the right end wall 216. At the front of the lid the spacer blocks 212B, functioning in the manner of the blocks 12B of FIG. 18, at the inside front corners of the lid 212 drop over the front edges of the end walls 215 and 216 to assure that the portion of drip rail 212R extending along the front edge of the lid 212 will be immediately in front of the latch mechanisms 40, and keep the latch mechanisms 40 in their latching positions, when the lid is closed and secured with the sealing strip 212S pressed into engagement at the front and sides of the lid 212 with the top flat edge portions of the door panel 214 and box end walls 215–216.

FIG. 24 is a section on line 24—24 of FIG. 22 illustrating one of multiple hinge connections 212H along the rear box wall 217 between the lid 212 and rear box wall. The rear wall 217 has a beveled top edge which is inclined downwardly and outwardly just below a complimentary depending beveled rear edge of the lid 212. Along these beveled edges the sealing strip 212S is located in a groove in the beveled lid edge. Beveling these rear edges contributes to draining water between these edges to the outside of the box 210.

The window panes 213 of the lid 212 are held at their edges by any suitable sealed framing structure 213F. The panes 213 of the lid 212 are made of a tough strong transparent durable scratch resistant plastic such as polycarbonate, preferably supported by means of the lid framing and of a thickness enabling a user to stand anywhere on the closed box lid 212.

FIG. 25 is a front view of the lower right front corner of a box installed in a bedliner 230 (shown only in part) in a truck bed floor 235 (shown only in part) and illustrating one of several quick-releasable adjustable draw latches 240 at the bottom of an end wall of the box 210 at each of its four box corners for anchoring the box to the bedliner and truck.

Figure 26:
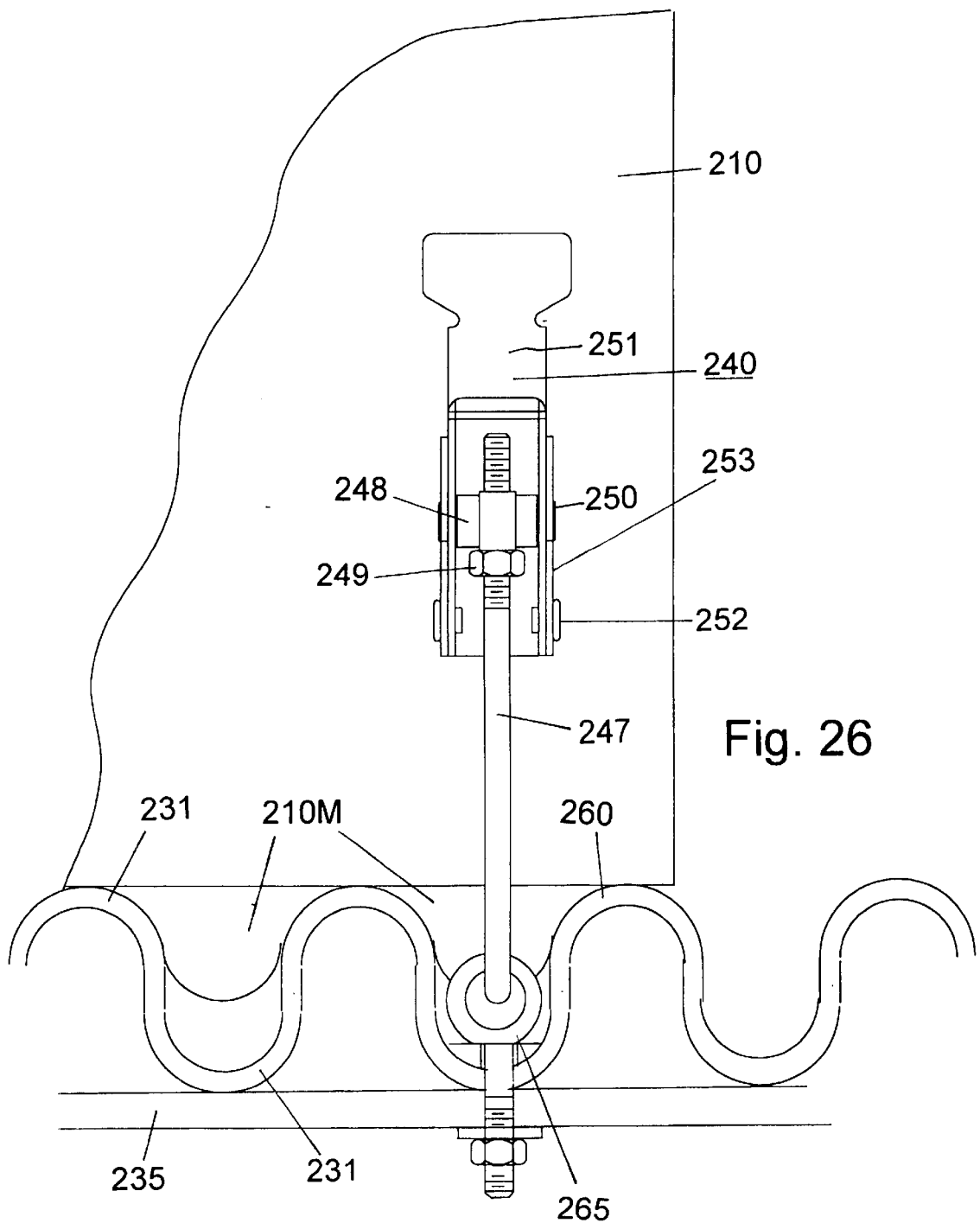

FIG. 26 is a front view of the lower right front corner of a modified box installation in a bedliner 231 (shown only in part) in a truck bed floor 235 (shown only in part) and illustrating one of several quick-releasable adjustable draw latches 240 at the bottom of a front or rear wall of the box at each of its four box corners for anchoring the box to the bedliner and truck.

Figure 27:
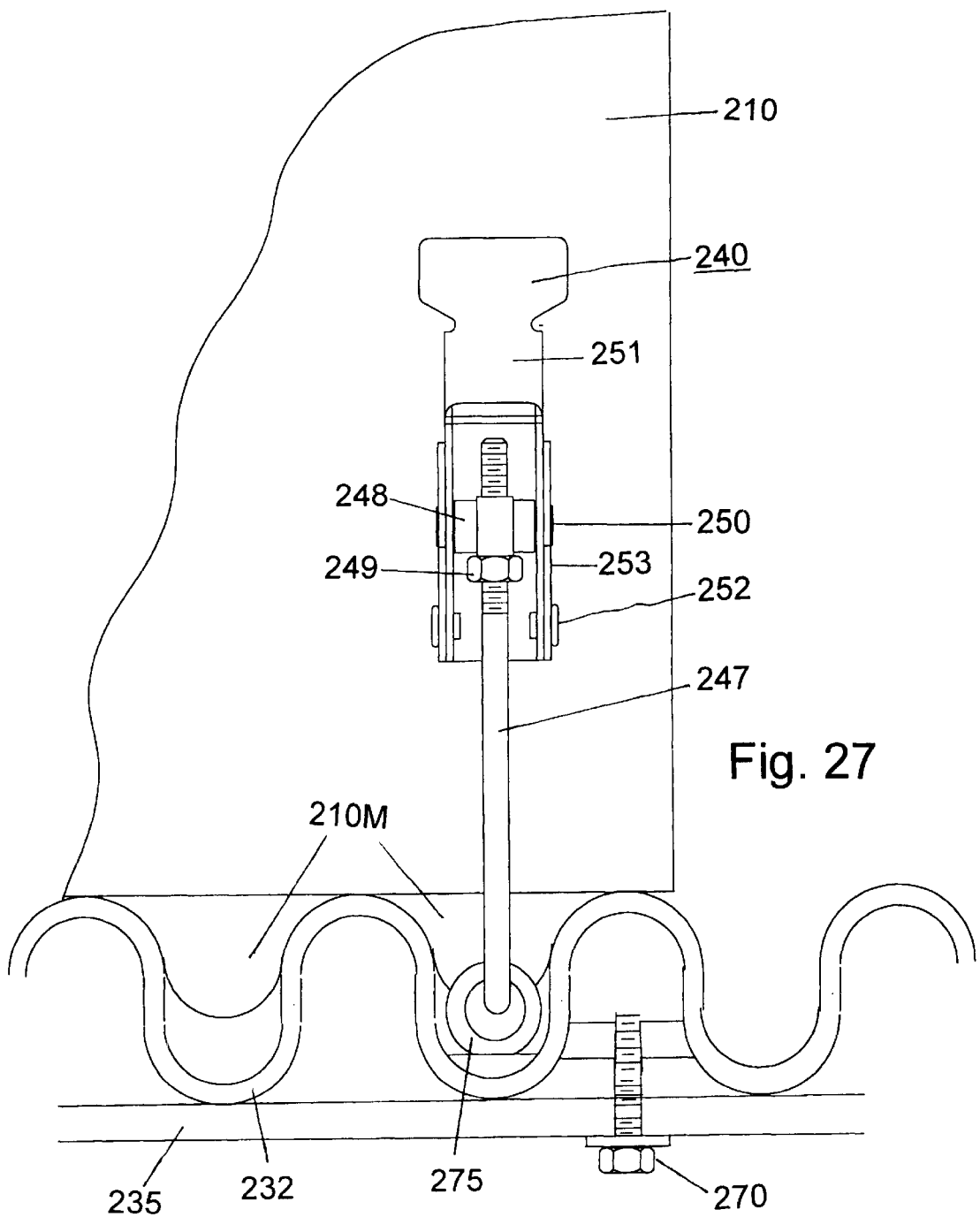

FIG. 27 is a front view of the lower right front corner of a modified box installation in a bedliner 232 (shown only in part) in a truck bed floor 235 (shown only in part) and illustrating one of several releasable adjustable draw latches 240 at the bottom of a front or rear wall of the box at each of its four box corners for anchoring the box to the truck bedliner and for anchoring the bedliner to a truck bed where all anchoring devices are installed with fasteners which need not pass completely through the bedliner.

The box 210 partially shown in FIGS. 25–27 may be constructed in accordance with the previously described embodiments. Multiple attachment or fastening means for securing the bedliner on the truck bed with its flat bottom resting on the truck bed, and manually operable quick release attachment or fastening means for securing said container to the bedliner are located in close proximate pairs at a plurality of locations spaced around the bottom of the container. This minimizes flexing of the bedliner floor when the truck bounces on rough terrain. The draw latch assembly 240 used in each of FIGS. 25, 26 and 27 is the same commercially available latch and reference to FIGS. 25 and 26 provides front and side views of the latch assembly 240. The adjustable length hooked latching rod 247 is threaded in a rod guide 248 and is locked in the guide to fix the position of the hook in an adjusted position by a jamb nut 249. The latching rod 247 and guide 248 are pivoted with a moving pin 250 pivotably carried by an operating lever 251. The lever 251 is pivoted on a stationary pin 252 in a base housing bracket 253 which is secured to an end wall of the box in the manner seen in FIG. 25 or to a front or back wall of the box in the manner shown in FIGS. 26. Although the threaded rod of the latching hook 247 is rotatable in the rod guide 248, the tip 257 of the hook 247 in each of FIGS. 25 and 26 is oriented to move in the plane of swinging movement of the latching rod whereby the tip may be latched in an aperture or recess 264 in the side of one of the bedliner ribs 260 as in FIG. 25 or in the aperture of an eye-bolt 265 or other transversely extending hookable structure having an access aperture facing in the direction of the parallel corrugated grooves between adjacent bedliner ribs in the bottom of the bedliner. The quick release latching assembly means 240 includes a manually operable portion carried by the container and a releasable latching structure engaging anchoring bedliner portions within ribs of the bedliner bottom.

In both embodiments of FIGS. 25 and 26 the latching rod is held in latching position by over-center movement of the moving pin 250 closer to the box wall than the stationary pin 252 If desired a padlockable hasp can be mounted on the base housing 253 and extending through a slot in the operating lever 251 in a manner similar to the hasp arrangement shown for the latch assembly 40 previously described.

When using a bedliner it is necessary to anchor the bedliner to the truck bed. It is common practice to secure the rails of the bedliner to the rails of the truck bed by a variety of fastening means well known but not shown. However since the present storage box is intended for quick attachment and detachment relative to the truck bed floor 235, it can be attached at the floor 235 near its four box corners to along with the bedliner by the eyebolts 265 as shown in FIG. 26.

It is preferable to attach the bedliner to the box near the bottom four corners of the box and to the truck bed near these four bottom box corners by fastening means formed integrally with the bedliner to avoid defacing the bedliner and comprising its waterproof integrity as by drilling. The bedliner has a waterproof bottom and the fastening means are installed to perform their securing functions without affecting the waterproof integrity of the bottom of the bedliner. Accordingly, the attaching means shown in FIG. 27 may be used. The bedliner 232 has integrally formed threaded fasteners each of which anchor it to the truck bed 235 by a respective bolt 270 and integrally molded eye-fasteners 275 beneath the top surface of the bedliner 232 and between adjacent bedliner ribs 260. Each eye-fastener 275 is h is releasably engaged by a latching hook 247 of the respective latching assembly 240.

Other variations within the scope of this invention will be apparent from the described embodiments and it is intended that the present descriptions be illustrative of the inventive features encompassed by the appended claims.

What is claimed is:

1. An elongated lockable rainproof storage container for use in a bed of a pickup truck, said container having:

a flat bottom floor, a vertical front wall, two vertical end walls and a fourth wall opposite said front wall, the four walls being generally perpendicular to the flat bottom floor, a top rainproof container closure supported atop said walls and movable between closed and open positions to provide access to the interior of the container, said front wall including an elongated rectangular swingable panel with hinge means along a lower elongated edge of the panel connecting said panel to the container bottom by means including an elongated continuous waterproof hinge permitting the panel to swing about ninety degrees between an erect first position perpendicular to the container bottom and a second load supporting position parallel to the container bottom floor, sealing means at opposite ends of said panel forming a watertight seal between said panel and said end walls when said panel is swung to said first position, said container providing a vertically unobstructed load storage access space between the container end walls and at the location of the front wall and communicating with an adjacent area outside the container when the container closure is opened and the panel is in said second position.

2. A container according to claim 1 including a jamb member extending inwardly from the front edge of each end wall, the jamb members providing stop means to limit the movement of the panel at said first position when it is swung upwardly from said second position.

3. A container according to claim 2 wherein each jamb member supports a sealing strip to form said watertight seal between the jamb and the respective end of the panel when the panel is moved to said first position, said sealing means including sealing structure cooperating with the ends of the elongated waterproof hinge and the lower ends of the jamb sealing strips to assure continuous watertight sealing at the bottom and ends of the swingable panel when it is in said first position.

4. A container according to claim 3 including clamping means anchored at the upper end of each jamb for securing the respective end of the panel in tight sealing engagement with the jamb member.

5. A container according to claim 4 wherein said clamping means also provides substantial vertical support for said panel to reduce the vertical load on said hinge and help protect the hinge when the panel is in said first position.

6. A container according to claim 3 wherein said panel engages the sealing strips at the rear of the jamb members.

7. A container according to claim 1 wherein the continuous hinge is the principal support for the panel during its swinging movement between said first and second positions.

8. A container according to claim 2 wherein the jamb members are horizontally relatively spaced at a distance at least equal to the space between the wheel wells of a pickup truck bed in which the container is to be installed.

9. A container according to claim 1 wherein said container includes a sill member extending across the container bottom at the location of the front wall and said continuous hinge has two relatively hinged elongated hinge strip portions connected respectively to said sill member and the bottom edge of the panel.

10. A container according to claim 2 wherein said container includes a sill member extending across the container bottom between said jambs and said continuous hinge has two relatively hinged elongated hinge strip portions connected respectively to said sill member and the bottom edge of the panel.

11. A container according to claim 1 wherein said continuous hinge comprises a flexible plastic waterproof foldable portion extending along the lower edge of the panel with a plastic strip portion at each side of said foldable portion with means securing said strip portions in sealed relationship to said lower edge of the panel and to the container bottom, respectively.

12. A container according to claim 1 wherein said continuous hinge comprises a foldable portion extending along the lower edge of the panel with strip portion at each side of said foldable portion with means securing said strip portions in sealed relationship to said lower edge of the panel and to the container bottom, respectively, and said foldable portion having a waterproof surface between said strip portions to provide a waterproof seal along the length of the hinge.

13. An elongated rainproof storage container for use transversely at the forward end of a bed of a pickup truck, said container having:
   a flat bottom floor,
   a vertical front wall,
   two vertical end walls and
   a fourth wall opposite said front wall,
   the four walls being generally perpendicular to the flat bottom floor,
   a top rainproof container closure supported atop said walls and movable between closed and open positions to provide access to the interior of the container,
   said front wall including an elongated rectangular swingable panel with hinge means along a lower elongated edge of the panel connecting said panel to the container bottom by means including an elongated continuous flexible waterproof hinge permitting the panel to swing about ninety degrees between an erect first position perpendicular to the container bottom and a second load supporting position parallel to the container bottom floor,
   sealing means at opposite ends of said panel forming a watertight seal between said panel and said end walls when said panel is swung to said first position,
   said container providing a vertically unobstructed load storage access space between the container end walls and at the location of the front wall and communicating with an adjacent area outside the container when the container closure is opened and the panel is in said second position.

14. A container according to claim 13 wherein said panel is swingable into the container to a position lying atop the container bottom.

15. A watertight container according to claim 14 which is provided with at least one gaseous or vapor previous and water impervious vent to enable internal-external pressure compensation to protect watertight seals as environmental conditions, including temperature, change substantially, and physical protection means for each such the vent, including perforated inner and outer plates.

16. A container according to claim 14 wherein said container includes a sill member extending across the container bottom between said jambs and said continuous hinge has two relatively hinged elongated hinge strip portions connected respectively to said sill member and the bottom edge of the panel.

17. A container according to claim 16 wherein the two elongated hinge strips are interconnected by a narrow hinge portion of reduced thickness which essentially encircles the axis of hinging to facilitate hinging action of the hinge.

18. A container according to claim 17 wherein said two relatively hinged elongated hinge strip portions are in abutment when the panel is in its second position and said narrow hinge portion of reduced thickness has a very small radius of curvature.

19. A container according to claim 18 wherein the height of the sill member and the thickness of the panel make their upper surfaces coplanar when the panel is in said second position.

20. A container according to claim 19 wherein the proximity of the adjacent edges of said upper coplanar surfaces of the swingable panel and the sill member substantially conceal the elongated hinge and protect it from damage and wear when the panel is in its second position.

21. A sealable waterproof storage container having:
   a plurality of sides enclosing a waterproof storage area,
   said sides defining a peripheral edge of a top access opening providing access to said area,
   a closure for said access opening,
   said sides including a flat vertical rigid panel having a straight horizontally extending elongated bottom edge at the bottom of said storage area,
   said container including a continuous waterproof hinge means extending the length of said bottom edge and supporting said vertical panel for swinging movement about said bottom edge between its vertical position and a horizontal position, said container providing a vertically unobstructed load storage access space between the top opening and the location of the front wall and communicating with an adjacent area outside the container when the container closure is opened and the panel is in said horizontal position,
   said vertical panel having a top edge defining part of said peripheral opening edge,
   said panel having two opposite side edges extending vertically between respective ends of the bottom edge and the top edge of the panel,
   said container having a first rigidly supported structure extending along a first of said side edges when the panel is in its vertical position,
   said container having a second rigidly supported structure extending along the second of said side edges when the panel is in its vertical position,
   a first clampable sealing structure comprising compressible waterproof sealing means between said first rigidly supported structure and said first side edge and in sealing engagement with a first end of said waterproof hinge means when the panel is in its vertical position,
   a second clampable sealing structure comprising compressible waterproof sealing means between said second rigidly supported structure and said second side edge and in sealing engagement the second end of said waterproof hinge means when the panel is in its vertical position, and
   clamping means for simultaneously exerting clamping forces on each of said clampable sealing structures when the panel is in its vertical position to maintain a continuous waterproof seal around the sides and bottom of said panel from one end of said top panel edge to the other end of said top panel edge.

22. A sealable waterproof storage container according to claim 21 including sealing means between said closure and said access opening to prevent entry of foreign contaminants into said storage container when said clamping forces are exerted with the panel in its vertical position and said access opening is closed by said closure.

23. A sealable waterproof storage container according to claim 21 in combination with a bedliner for supporting the container on the floor of a truck bed, said container and said bedliner having flat bottoms in contact with each other, multiple attachment means for securing the bedliner on the truck bed with its flat bottom resting on the truck bed, and manually operable quick release attachment means for securing said container to the bedliner at a plurality of locations spaced around the bottom of the container.

24. A combination of a sealable waterproof storage container and a truck bedliner according to claim 23 wherein the bottom of the bedliner has corrugated ribs and said quick release means includes a manually operable portion carried by the container and a releasable latching structure engaging anchoring bedliner portions within ribs of the bedliner bottom.

25. A combination of a sealable waterproof storage container and a truck bedliner according to claim 23 wherein the bedliner has a waterproof bottom and the attachment means are installed to perform their securing functions without affecting the waterproof integrity of the bottom of the bedliner.

26. A combination of a sealable waterproof storage container and a truck bedliner according to claim 23 wherein said multiple attachment means are located close to the quick release attachment means.

27. A container according to claim 6 including at each jamb a second sealing strip including sealing structure cooperating with the ends of the elongated waterproof hinge and the lower ends of the second sealing strip to provide spaced parallel vertical seals along each end of the panel.

28. A container according to claim 27 wherein at each jamb the end of the panel is clamped against one of the sealing strips and the panel end is is in sliding sealing engagement with the other sealing strip.

29. A container according to claim 6 including wherein the panel is swingable into the container to a horizontal position lying atop the container bottom and including a ramp member attached ed to the container in a loading position with an inclined upper ramp surface to facilitate moving loads into the container when the panel is in its horizontal position.

30. A container according to claim 29 wherein said ramp member is detachable from its loading position and including ramp support structures inside the container near the rear of the jambs for storing the ramp across the back of the panel and for holding the ramp against the panel to brace it against inward movement when the panel is in its erect sealed position.

* * * * *